(12) United States Patent
Hawass

(10) Patent No.: US 9,205,291 B2
(45) Date of Patent: Dec. 8, 2015

(54) AERIAL DISTRIBUTION SYSTEM

(75) Inventor: Oubada Hawass, Mississauga (CA)

(73) Assignee: AERIAL X EQUIPMENT, Mississauga, Ontario (CA)

( * ) Notice: Subject to any disclaimer, the term of this patent is extended or adjusted under 35 U.S.C. 154(b) by 903 days.

(21) Appl. No.: 13/378,224

(22) PCT Filed: Jun. 15, 2010

(86) PCT No.: PCT/CA2010/000888
§ 371 (c)(1),
(2), (4) Date: Dec. 14, 2011

(87) PCT Pub. No.: WO2010/145006
PCT Pub. Date: Dec. 23, 2010

(65) Prior Publication Data
US 2012/0112007 A1 May 10, 2012

Related U.S. Application Data

(60) Provisional application No. 61/187,254, filed on Jun. 15, 2009.

(51) Int. Cl.
*A62C 3/02* (2006.01)
*B64D 1/18* (2006.01)
*A62C 31/24* (2006.01)

(52) U.S. Cl.
CPC ............... *A62C 3/0228* (2013.01); *B64D 1/18* (2013.01); *A62C 31/24* (2013.01)

(58) Field of Classification Search
CPC .... A62C 3/0228; A62C 3/0242; A62C 31/24; B64D 1/16; B64D 1/18
USPC ........ 169/52, 53, 67; 239/159, 161, 163, 171, 239/289
See application file for complete search history.

(56) References Cited

U.S. PATENT DOCUMENTS

| 1,523,926 A | 1/1925 | Ypma |
| 2,730,133 A | 1/1956 | Holland-Bowyer et al. |

(Continued)

FOREIGN PATENT DOCUMENTS

| CN | 1812912 | 8/2006 |
| FR | 2737853 | 2/1997 |

(Continued)

OTHER PUBLICATIONS

International Search Report received on the corresponding international patent application No. PCT/CA2010/000888.

(Continued)

*Primary Examiner* — Arthur O Hall
*Assistant Examiner* — Viet Le
(74) *Attorney, Agent, or Firm* — Bereskin & Parr LLP S.E.N.C.R.L., S.R.L.; Philip Menoes da Costa; Kevin Shipley

(57) ABSTRACT

An aerial distribution system includes a fluid distribution head having at least one head fluid inlet in fluid communication with a fluid source, and at least one head fluid outlet. The fluid distribution head is reconfigurable between a deployed position and a collapsed position. The aerial distribution system further includes a suspension assembly for suspending the fluid distribution head from an aerial lift system, and a deployment assembly coupled to the fluid distribution head and actuatable to reconfigure the fluid distribution head between the deployed position and the collapsed position.

23 Claims, 23 Drawing Sheets

(56) References Cited

U.S. PATENT DOCUMENTS

Figure 1:
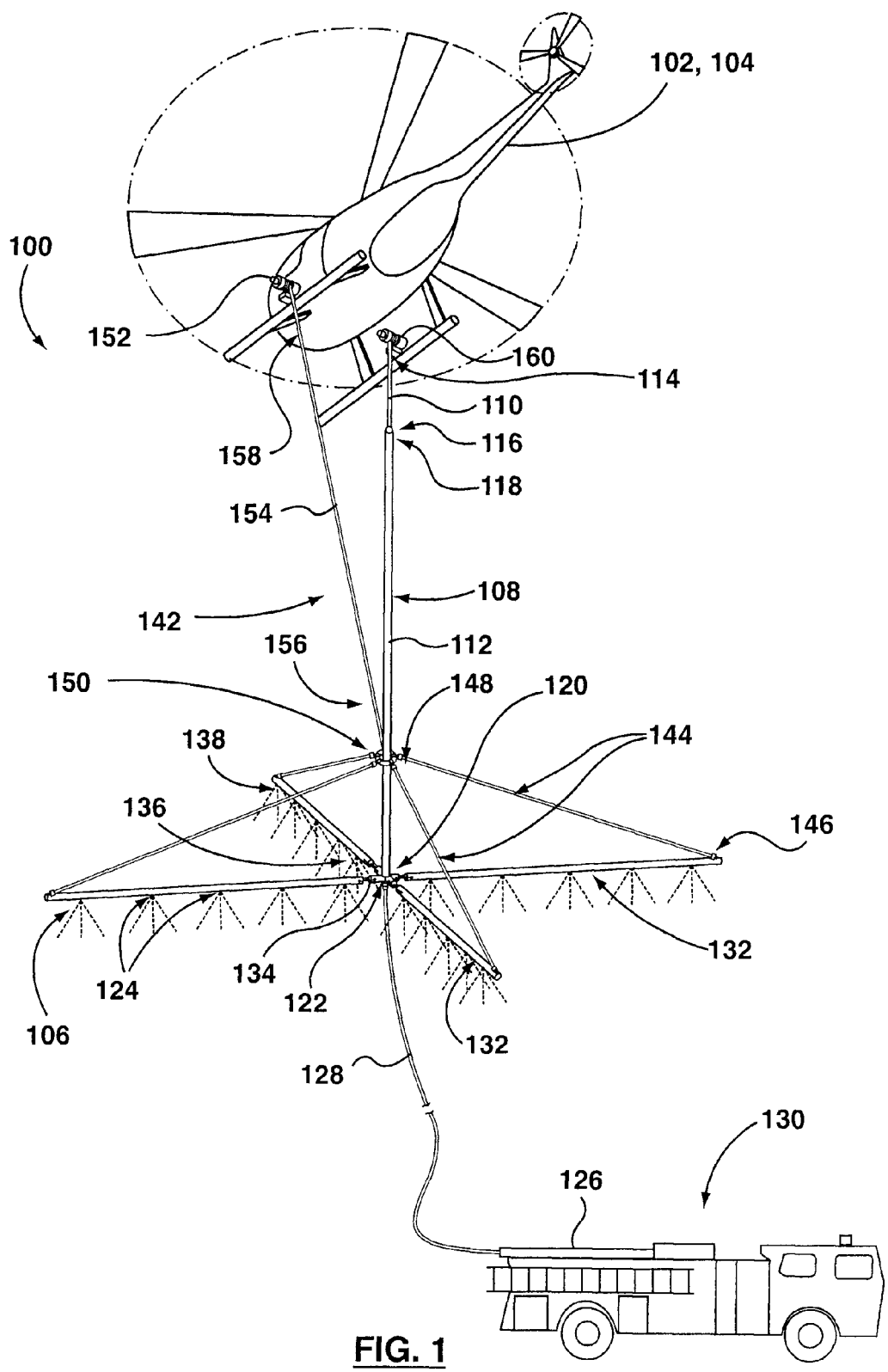

| | | | | |
|---|---|---|---|---|
| 2,779,421 A | * | 1/1957 | Rust | 169/53 |
| 2,809,268 A | | 10/1957 | Heron | |
| 3,166,688 A | | 1/1965 | Rowand et al. | |
| 3,220,482 A | | 11/1965 | Eveleth | |
| 3,240,234 A | | 3/1966 | Bond, Jr. et al. | |
| 3,428,276 A | * | 2/1969 | Hubbard | 244/136 |
| 3,442,334 A | | 5/1969 | Gousetis | |
| 3,580,339 A | | 5/1971 | Nance | |
| 3,714,987 A | | 2/1973 | Mattson | |
| 3,759,330 A | | 9/1973 | Rainey et al. | |
| 3,818,116 A | | 6/1974 | Kuljian | |
| 3,828,857 A | | 8/1974 | Mason | |
| 3,897,829 A | | 8/1975 | Eason | |
| 3,933,309 A | | 1/1976 | Odegaard | |
| 3,963,856 A | | 6/1976 | Carlson | |
| 4,009,850 A | | 3/1977 | Hickey | |
| 4,090,567 A | | 5/1978 | Tomlinson | |
| 4,196,464 A | | 4/1980 | Russell | |
| 4,212,347 A | | 7/1980 | Eastman | |
| 4,240,507 A | | 12/1980 | Hokkanen | |
| 4,246,309 A | | 1/1981 | Daniel et al. | |
| 4,344,489 A | | 8/1982 | Bonaparte | |
| 4,870,535 A | | 9/1989 | Matsumoto | |
| 4,936,389 A | | 6/1990 | MacDonald et al. | |
| 4,987,953 A | | 1/1991 | Hedstrom | |
| 5,135,055 A | | 8/1992 | Bisson | |
| 5,295,625 A | | 3/1994 | Redford | |
| 5,319,155 A | | 6/1994 | Maroist | |
| 5,326,053 A | | 7/1994 | Pahl et al. | |
| 5,385,208 A | | 1/1995 | Baker et al. | |
| 5,549,259 A | | 8/1996 | Herlik | |
| 5,590,717 A | | 1/1997 | McBay et al. | |
| 5,699,862 A | * | 12/1997 | Rey | 169/53 |
| 5,985,385 A | | 11/1999 | Gottfried | |
| 6,003,782 A | | 12/1999 | Kim et al. | |
| 6,125,942 A | | 10/2000 | Kaufman et al. | |
| 6,192,990 B1 | | 2/2001 | Brooke | |
| 6,267,148 B1 | | 7/2001 | Katayama et al. | |
| 6,510,805 B2 | | 1/2003 | Fima et al. | |
| 6,578,796 B2 | | 6/2003 | Maeda | |
| 6,688,402 B1 | | 2/2004 | Wise | |
| 6,769,493 B1 | * | 8/2004 | Fima et al. | 169/53 |
| 6,860,449 B1 | | 3/2005 | Chen | |
| 6,874,734 B2 | | 4/2005 | Ramage et al. | |
| 6,889,776 B2 | | 5/2005 | Cheung | |
| 7,013,964 B2 | | 3/2006 | Pays et al. | |
| 7,093,789 B2 | | 8/2006 | Barocela et al. | |
| 7,156,342 B2 | | 1/2007 | Heaven, Jr. et al. | |
| 7,303,168 B1 | | 12/2007 | Lazes | |
| 8,371,392 B2 | | 2/2013 | Ba-Abbad | |
| 2002/0079379 A1 | | 6/2002 | Cheung | |
| 2002/0121382 A1 | | 9/2002 | Fima et al. | |
| 2009/0266566 A1 | | 10/2009 | Bin Abdul Aziz Al Saud | |
| 2013/0277074 A1 | | 10/2013 | Corujo Pardo | |

FOREIGN PATENT DOCUMENTS

| | | |
|---|---|---|
| GB | 2094668 | 9/1982 |
| GB | 2184512 B | 2/1990 |
| WO | 98/52647 | 11/1998 |
| WO | 00/24472 | 5/2000 |
| WO | 2010145006 | 12/2010 |

OTHER PUBLICATIONS

Spray System, Simplex Model 6860; Simplex Mfg Aviation Mission Equipment; retrieved at URL: http://www.simplexmfg.net/brochures/SimplexManufacturingSpray6860(2009)Brochure.pdf.

Office Action, Issued in Related Chinese Patent Application No. 201080035870.2 on Dec. 18, 2013.

* cited by examiner

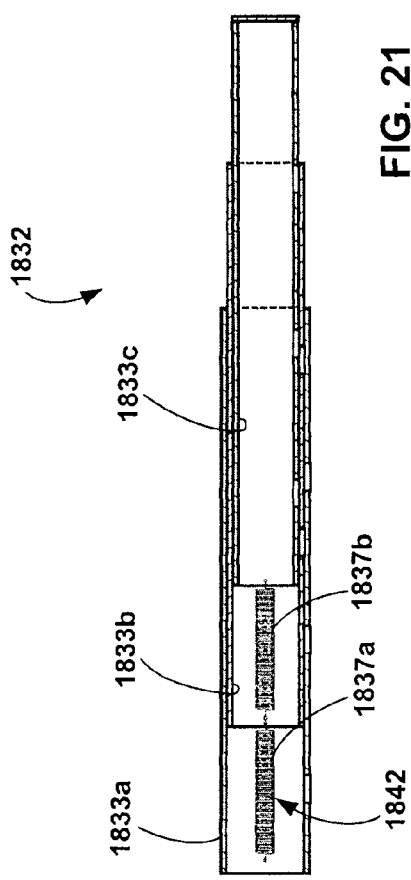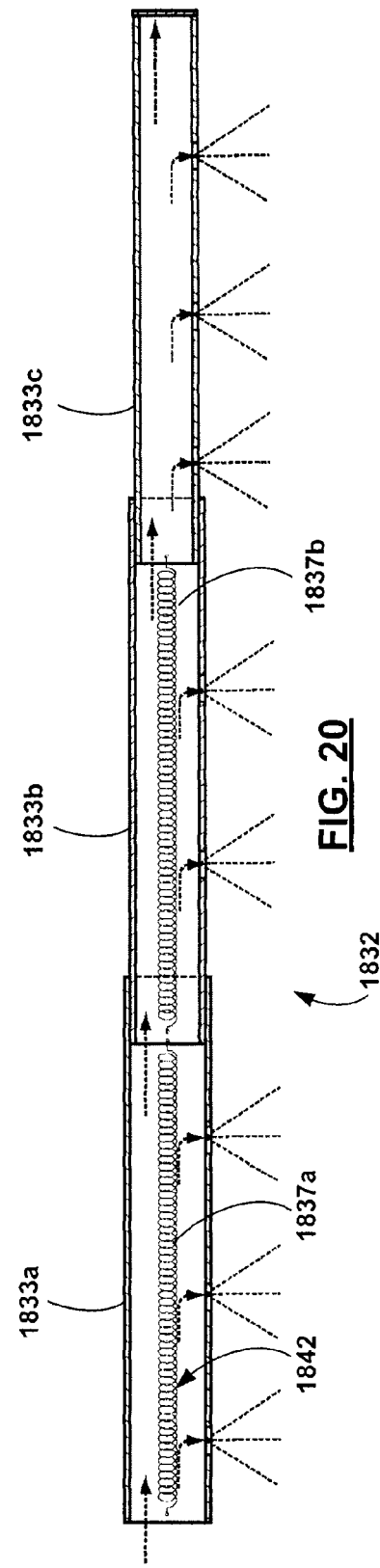

AERIAL DISTRIBUTION SYSTEM

CROSS REFERENCES TO RELATED APPLICATIONS

This application claims priority from U.S. Provisional Patent Application No. 61/187,254 (filed on Jun. 15, 2009), which is incorporated herein by reference in its entirety.

FIELD

The disclosure relates to aerial distribution systems. Specifically, the disclosure relates to aerial distribution systems for distributing fluid, such as a firefighting medium, from an aerial lift system, such as a helicopter.

INTRODUCTION

The following is not an admission that anything discussed below is prior art or part of the common general knowledge of persons skilled in the art.

U.S. Pat. No. 6,889,776 (Cheung) discloses an apparatus for use with a container of liquid that is suspended from an aircraft flying over a ground target area. The container has an outlet through which the liquid is dropped from the container. The apparatus includes a diffuser configured to diffuse the liquid exiting the container outlet horizontally outward beyond the container into the air above the ground target area, whereby the liquid is diffused over a correspondingly wide area. The liquid can be fire-extinguishing liquid, and the ground target area can be a forest fire.

SUMMARY

The following summary is provided to introduce the reader to the more detailed discussion to follow. The summary is not intended to limit or define the claims.

According to one aspect, an aerial distribution system comprises a fluid distribution head comprising at least one head fluid inlet in fluid communication with a fluid source, and at least one head fluid outlet. The fluid distribution head is reconfigurable between a deployed position and a collapsed position. The aerial distribution system further comprises a suspension assembly for suspending the fluid distribution head from an aerial lift system, and a deployment assembly coupled to the fluid distribution head and actuatable to reconfigure the fluid distribution head between the deployed position and the collapsed position.

The fluid distribution head may comprise a plurality of fluid distribution arms. At least one of the head fluid outlets may be associated with each arm. When in the deployed configuration, each fluid distribution arm may extend at a first angle with respect to the horizontal. When in the collapsed configuration, each fluid distribution arm may extend at a second angle with respect to the horizontal, and the second angle may be greater than the first angle. For example, when in the deployed configuration, each fluid distribution arm may be generally horizontal, and when in the collapsed configuration, each fluid distribution arm may be generally vertical.

Each arm may have an arm first end portion and an arm second end portion spaced apart from the arm first end portion. The fluid distribution head may further comprise a hub, and each arm first end portion may be pivotably coupled to the hub.

The aerial distribution system may further comprise a generally vertically extending spine mounted to the hub. The spine may be provided by the suspension assembly. Each arm second end portion may be proximate the spine when the fluid distribution head is in the collapsed configuration, and distal the spine when the fluid distribution head is in the deployed configuration.

The aerial lift system may comprise a helicopter. The fluid distribution head may remain coupled to the helicopter during flight, including take-off and landing.

The deployment assembly may comprise at least one deployment cable. Each deployment cable may comprise a deployment cable first end portion secured to one of the arm second end portions, and a deployment cable second end portion that is raisable and lowerable to pivot each respective arm about the hub and reconfigure the fluid distribution head between the deployed position and the collapsed position.

The aerial distribution system may further comprise a vertically extending spine, and the deployment assembly may further comprise a slider to which each deployment cable second end portion is secured. The slider may be slidable along the spine to raise and lower each deployment cable second end portion.

The deployment assembly may further comprise a winch portable on board the aerial lift system, and a winching cable having a winching cable first end portion secured to the slider, and a winching cable second end portion secured to the winch.

The fluid distribution head may further comprise a hub, and each fluid distribution arm may be mounted to the hub such that each fluid distribution arm extends radially from the hub.

The suspension assembly may comprise a suspension cable having a suspension cable first end portion secured to the aerial lift system, and an opposed suspension cable second end portion. The suspension assembly may further comprise a spine having a spine first end portion secured to the suspension cable second end portion, an opposed spine second end portion. The fluid distribution head may comprise a hub secured to the spine second end portion. At least one fluid distribution arm may be mounted to the hub and extend outwardly from the hub.

The hub may comprise the at least one head fluid inlet, and the at least one fluid distribution arm may comprise the at least one head fluid outlet.

The aerial distribution system may further comprise a fluid conduit connectable between the fluid source and each head fluid inlet. For example, the aerial distribution system may further comprise a hose providing fluid communication between the fluid source and the at least one head fluid inlet. The fluid source may be portable on board the aerial lift system, or may be supported on the ground.

The suspension assembly may be actuatable to raise and lower the fluid distribution head with respect to the aerial lift system.

According to another aspect, an aerial distribution system comprises an aerial lift system moveable from ground level to an elevation above a target. A reservoir is mounted to the aerial lift system for holding a fluid. The reservoir is at a generally fixed elevation relative to the aerial lift system. A fluid distribution head is suspendable from the aerial lift system. The fluid distribution head comprises at least one head fluid inlet for receiving the fluid from the reservoir, and at least one head fluid outlet in fluid communication with the head fluid inlet. The aerial distribution system further comprises a suspension assembly for suspending the fluid distribution head from the aerial lift system. The suspension assembly is actuatable to move the fluid distribution head between a raised and a lowered position with respect to the aerial lift system.

The aerial distribution system may further comprise a hose having an upper end in fluid communication with the reservoir, and a lower end in fluid communication with the head fluid inlet. The hose may be collapsible into a stowed configuration when the fluid distribution head is in a raised position, and extendible to an extended position when the head is in the lowered position. The reservoir may comprise a reservoir outlet, and the hose may provide fluid communication between the reservoir outlet and the head inlet when the hose is in the extended position.

The aerial distribution system may further comprise a refill circuit for refilling the reservoir with fluid. The refill circuit may include a reservoir inlet spaced apart from the reservoir outlet. The refill circuit may comprise a non-collapsible refill conduit having a refill conduit outlet in fluid communication with the reservoir inlet, and a refill conduit inlet connectable in fluid communication with a refill source.

The suspension assembly may comprise a suspension cable having a cable first end portion secured to the aerial lift system and an opposed second end portion, and a spine having a spine first end portion secured to the cable second end portion, and a spine second end portion secured to the fluid distribution head. The suspension assembly may further comprise a winch portable on board the aerial lift system. The cable first end portion may be secured to the winch, and the winch may be actuatable to raise or lower the spine and fluid distribution head.

The spine may comprise a fluid conduit comprising an inlet, and an outlet. The aerial distribution system may further comprise a hose having an upper end in fluid communication with the reservoir, and an opposed lower end in communication with the inlet. The outlet may be communication with the head fluid inlet.

The reservoir may have a refill inlet. The spine may serve as a refill conduit having a refill conduit outlet in fluid communication with the reservoir inlet, and a refill conduit inlet connectable in fluid communication with a refill source. The refill conduit outlet may be connectable in fluid communication with the refill inlet when the fluid distribution head is in a raised configuration.

The fluid distribution head may comprise at least one fluid distribution arm that is reconfigurable between a deployed position and a collapsed position.

DRAWINGS

Reference is made in the detailed description to the accompanying drawings, in which:

FIG. 1 is a perspective illustration of an exemplary aerial distribution system, showing a fluid distribution head in a deployed configuration;

FIG. 2, is a perspective illustration of the aerial distribution system of FIG. 1, showing the fluid distribution head in a collapsed configuration;

FIG. 3 is an elevation view of the fluid distribution head of FIG. 1;

FIG. 4 is a bottom view of the fluid distribution head of FIG. 1;

FIG. 5 is a perspective illustration of an alternate exemplary aerial distribution system;

FIG. 6 is a perspective illustration of another alternate exemplary aerial distribution system;

FIG. 7 is a perspective illustration of another alternate exemplary aerial distribution system;

FIG. 8 is a perspective illustration of another alternate exemplary aerial distribution system;

FIG. 9 is a perspective illustration of an alternate exemplary fluid distribution head;

FIG. 10 is a perspective illustration of another alternate exemplary fluid distribution head;

FIG. 11 is a perspective illustration of another alternate exemplary fluid distribution head;

FIG. 12 is a perspective illustration of another alternate exemplary fluid distribution head;

FIG. 13 is a perspective illustration of another alternate exemplary fluid distribution head;

FIG. 14 is a perspective illustration of another alternate exemplary fluid distribution head;

FIG. 15 is a perspective illustration of another alternate exemplary fluid distribution head;

FIG. 16 is a perspective illustration of another alternate exemplary fluid distribution system;

FIG. 17 is a perspective illustration of another alternate exemplary fluid distribution head;

FIG. 18 is a perspective illustration of another alternate exemplary aerial distribution system, showing a fluid distribution head in a deployed configuration;

FIG. 19 is a perspective illustration of the aerial distribution system of FIG. 18, showing the fluid distribution head in a collapsed configuration;

FIG. 20 is a cross section taken along line 20-20 in FIG. 18;

FIG. 21 is a cross section taken along line 21-21 in FIG. 19;

FIG. 22 is a perspective illustration of another alternate exemplary aerial distribution system, showing a fluid distribution head in a lowered configuration;

FIG. 23 is a perspective illustration of the aerial distribution system of FIG. 22, showing the fluid distribution head in a raised configuration;

FIG. 24 is an elevation view of the fluid distribution head of FIG. 22;

FIG. 25 is a perspective illustration of another alternate fluid distribution head; and FIG. 26 is a perspective illustration of another alternate fluid distribution head.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Referring to FIG. 1, an aerial distribution system 100 is shown. The aerial distribution system 100 is coupled to an aerial lift system 102, and is usable to distribute a fluid to a target area. For example, the aerial distribution system 100 may be used to distribute a firefighting fluid to an area in which a forest fire is occurring.

The aerial lift system 102 may be any system capable of lifting the aerial distribution system over a target area. In the example shown, the aerial lift system 100 is a helicopter 104. In alternate examples, an aerial lift system may be another system that is moveable from ground level to an elevation above a target, such as an airplane. In further alternate examples, an aerial lift system may include a pole, crane or other land-based apparatus.

The fluid distributed by the aerial distribution system 100 may be any suitable fluid, including but not limited to water, foam, or chemicals. For example, where the aerial distribution system 100 is being used to fight a fire, the fluid may be a fire retardant liquid, and/or water.

Referring still to FIG. 1, the fluid distribution system 100 includes a fluid distribution head 106, which is suspended from the aerial lift system 102 by a suspension assembly 108.

In the example shown, the suspension assembly 108 includes a suspension cable 110 and an optional spine 112. The suspension cable 110 has a suspension cable first end portion 114 secured to the helicopter 104, and an opposed suspension cable second end portion 116. The spine 112 includes a spine first end portion 118 secured to the suspension cable second end portion 116, an opposed spine second end portion 120 to which the fluid distribution head 106 is secured. The spine may comprise a generally elongate rigid or semi-rigid member that extends along a spine axis. The spine 112 may be, for example, a rigid pipe or rod, and may be hollow or solid. The spine axis may be oriented generally vertically when the aerial distribution is in a raised positioned, for example, above a target zone.

Referring still to FIG. 1, the fluid distribution head 106 includes at least one head fluid inlet 122 in fluid communication with a fluid source 126, and at least one head fluid outlet 124, through which fluid is distributed to the target area. In the example shown, the fluid distribution head 106 includes one head fluid inlet 122, and a plurality of head fluid outlets 124. In alternate examples, a fluid distribution head may include more than one head fluid inlet, or only one head fluid outlet.

In the example illustrated, a fluid conduit in the form of a hose 128 provides fluid communication between the fluid source 126 and the head fluid inlet 122. In the example shown, the fluid source 126 is supported on the ground beneath the aerial lift system 102, and is in communication with the head fluid inlet 122 via the hose 128. The fluid source 126 may be on board a vehicle 130, and the hose 128 may extend from the vehicle 130 to the fluid distribution head 106. A pump (not shown) may be provided on the vehicle 130 to pump the fluid through the hose 128. The reservoir may optionally be continually refilled as fluid is pumped through the hose 128. For example, the reservoir may be continually refilled from a body of water such as a lake.

In alternate examples, a fluid source may be a reservoir that is on board the aerial lift system 102, and a hose may extend from the aerial lift system 102 to the fluid distribution head 106. The reservoir may be removable from, or fixed to, the lift system. In some examples, gravity may provide all or a portion of the force required to dispense the fluid from the reservoir to the distribution head through the hose. In further alternate examples, a fluid source may be a body of water, such as a lake, and a hose may extend from the body of water to the fluid distribution head 106. In further alternate examples, a fluid source may be a reservoir that is on board an alternate aerial lift system. For example, a reservoir may be on board a second helicopter that may trail the helicopter 104, and a hose may extend between the reservoir and the fluid distribution head 106.

Figure 2:
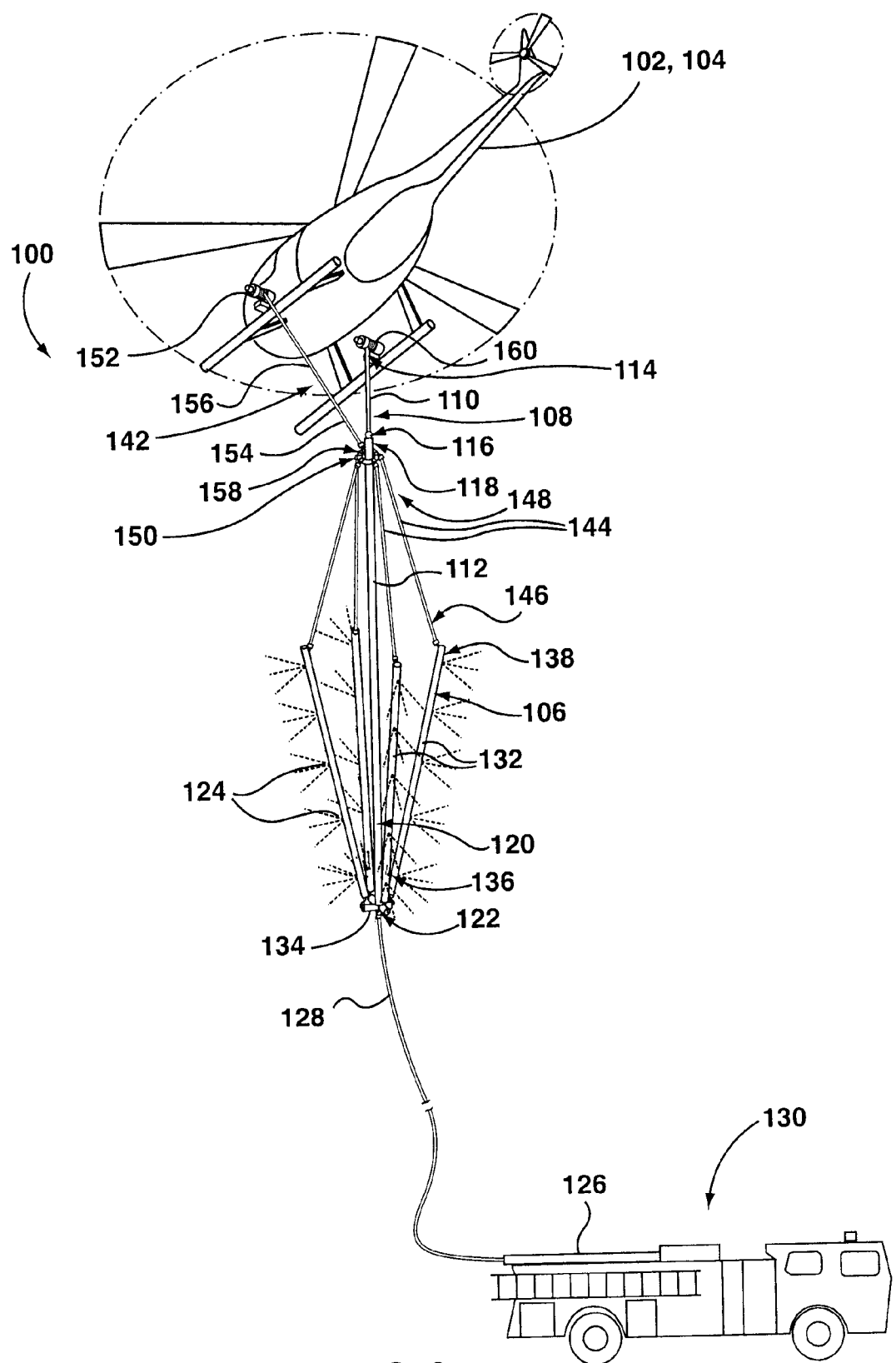
Figure 3:
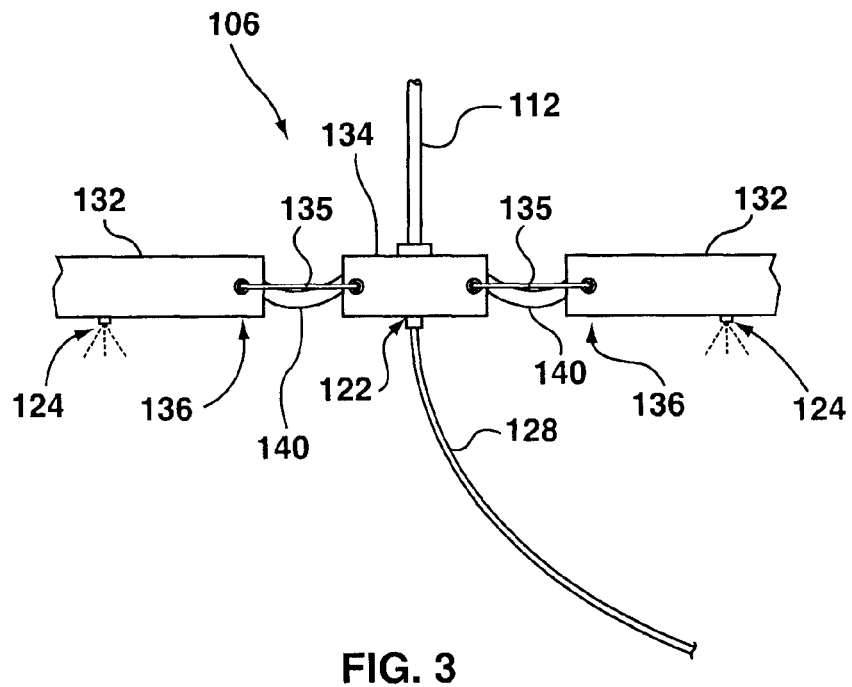
Figure 4:
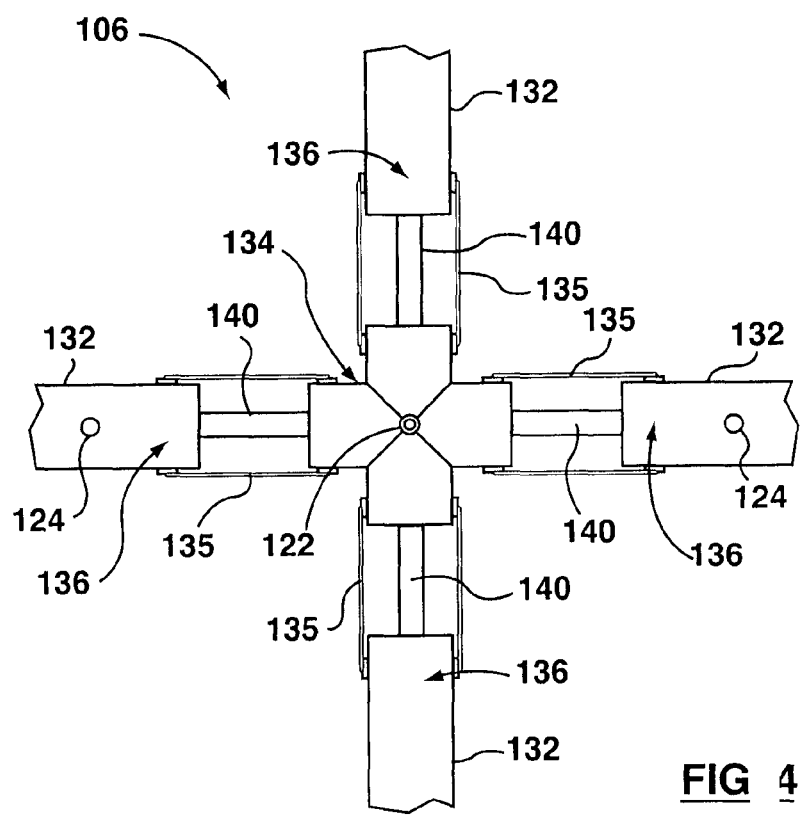

Referring to FIGS. 1 and 2, the fluid distribution head 106 is reconfigurable between a deployed position, shown in FIG. 1, and a collapsed position, shown in FIG. 2. Referring also to FIGS. 3 and 4, in the example shown, the fluid distribution head 106 includes a plurality of fluid distribution arms 132, and a hub 134, which may be mounted to (or may be of unitary, integral construction with) the spine 112. Each fluid distribution arm 132 has an arm first end portion 136, and an arm second end portion 138 spaced apart from the arm first end portion 136. The first end portion 136 of each arm 132 is pivotably coupled to the spine, and in the example illustrated is pivotably mounted to the hub 134 by a plurality of links 135, and the fluid distribution arms 132 extend radially from the hub 134.

When the fluid distribution head 106 is in the deployed configuration, as shown in FIG. 1, each fluid distribution arm 132 is pivoted about the hub 134 such that each fluid distribution arm 132 extends at a first angle with respect to the horizontal. When the fluid distribution head 106 is in the collapsed configuration, as shown in FIG. 2, each fluid distribution arm 132 is pivoted about the hub 134 such that each fluid distribution arm 132 extends at a second angle with respect to the horizontal that is greater than the first angle. In the example shown, when the fluid distribution head 106 is in the deployed configuration, each fluid distribution arm 132 is generally horizontal, and when in the collapsed configuration, each fluid distribution arm 132 is generally vertical.

In the example shown, the head fluid outlets 124 are associated with the arms 132, and the head fluid inlet 122 is associated with the hub 134. Particularly, each arm 132 has at least one head fluid outlet 124 spaced between the arm first end portion 136 and the arm second end portion 138. In the example shown, each arm 132 has a plurality of head fluid outlets 124 spaced along the arm 132 between the arm first end portion 136 and the arm second end portion 138. The head fluid outlets 124 are in communication with the head fluid inlet 122 via a plurality of head hoses 140, which extend from the hub 134 to each arm first end portion 136.

Referring back to FIGS. 1 and 2, the fluid distribution head 106 may be used to distribute fluid when in the deployed position, the collapsed position, or a position therebetween. In the deployed position, each arm second end portion 138 is distal the spine 112, so that the head fluid outlets 124 are spaced laterally away from the spine 112, and the fluid distribution head 106 may distribute fluid to a relatively large area. In the collapsed position, each arm second end portion 138 is proximate the spine 112, and the head fluid outlets 124 are moved laterally towards the spine 112, so that the fluid distribution head 106 may distribute fluid to a relatively small area. Further, when the aerial lift system 102 is travelling to and from the target area, and the fluid distribution head 106 is not necessarily being used to distribute fluid, the fluid distribution head 106 may optionally be configured in the collapsed position, to allow for better aerodynamics. The fluid outlets 124 are generally spaced laterally apart from the spine (in a direction generally orthogonal to the spine axis) by a first outlet spacing when in the collapsed position, and a second outlet spacing when in the deployed position, the second outlet spacing being greater than the first outlet spacing. The first (inner) portions of the arms may be generally spaced laterally apart from the spine by an inner arm end spacing, and the inner arm end spacing is, in the example illustrated, less than the second outlet spacing.

Referring still to FIGS. 1 and 2, the fluid distribution system 100 further includes a deployment assembly 142, which is coupled to the fluid distribution head 106, and which is actuatable to reconfigure the fluid distribution head 106 between the deployed position and the collapsed position.

The deployment assembly 142 may include at least one deployment cable. In the example shown, the deployment assembly 142 includes a plurality of deployment cables 144, and each deployment cable 144 includes a deployment cable first end portion 146 secured to one of the arm second end portions 138, and a deployment cable second end portion 148 that is raisable and lowerable to pivot each respective arm 132 about the hub 134 and reconfigure the fluid distribution head 106 between the deployed position and the collapsed position.

In the example shown, in order to raise and lower each cable second end portion 148, the deployment assembly further includes a slider 150 to which each deployment cable second end portion 148 is secured. The slider 150 is slidable along the spine 112. For example, the slider 150 may include a ring received on the spine 112, and slidable therealong. The deployment assembly 142 further includes a winch 152 that is portable on board the helicopter 104, and a winching cable 154 that has a first end portion 156 secured to the slider, and a second end portion 158 secured to the winch 152. The winch 152 may be actuated to draw in or let out the winching cable 154, to raise and lower the slider 150 on the spine 112, and raise and lower each deployment cable second end portion 148.

In the example shown, the suspension assembly 108 is actuatable to raise and lower the fluid distribution head 106 with respect to the helicopter 104. For example, the fluid distribution head 106 may be raised when the aerial lift system 102 is travelling to and from the target area, and the fluid distribution head 106 is not necessarily being used to distribute fluid. Further, the fluid distribution had 106 may be lowered with the fluid distribution head is in use to distribute fluid. In the example shown, in order to raise and lower the fluid distribution head 106, the suspension cable first end portion 118 is coupled to a second winch 160 that is portable on board the helicopter 104. The second winch 160 may be actuated to draw in or let out the suspension cable 110, to raise and lower the fluid distribution head 106.

Figure 5:
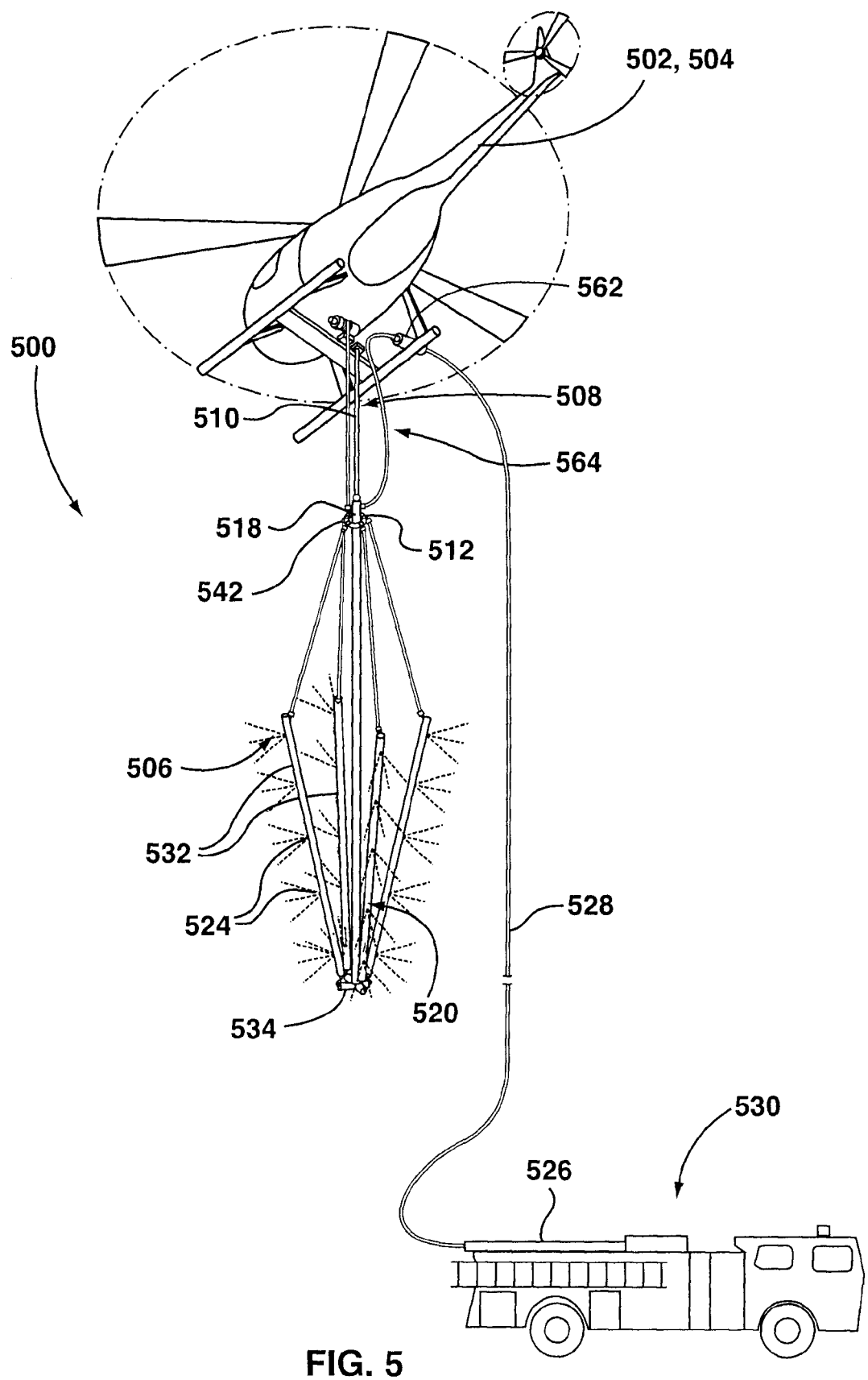

Referring now to FIG. 5, in which like reference numerals are used to refer to like elements as in FIGS. 1 to 4, with the first digit incremented to 5, an alternate example of an aerial distribution system 500 is shown. In this example, the hose 528 extends from the vehicle 530 to a pump 562 that is on board the helicopter 504. A second hose 564 extends between the pump 562 and the first end portion 118 of the spine 512. The spine 512 includes a fluid conduit that has an inlet in communication with the second hose 564, and an outlet in communication with the head fluid inlet 522.

In alternate examples, the pump 562 may be mounted in alternate locations. For example, the pump may be mounted to the spine 512.

Figure 6:
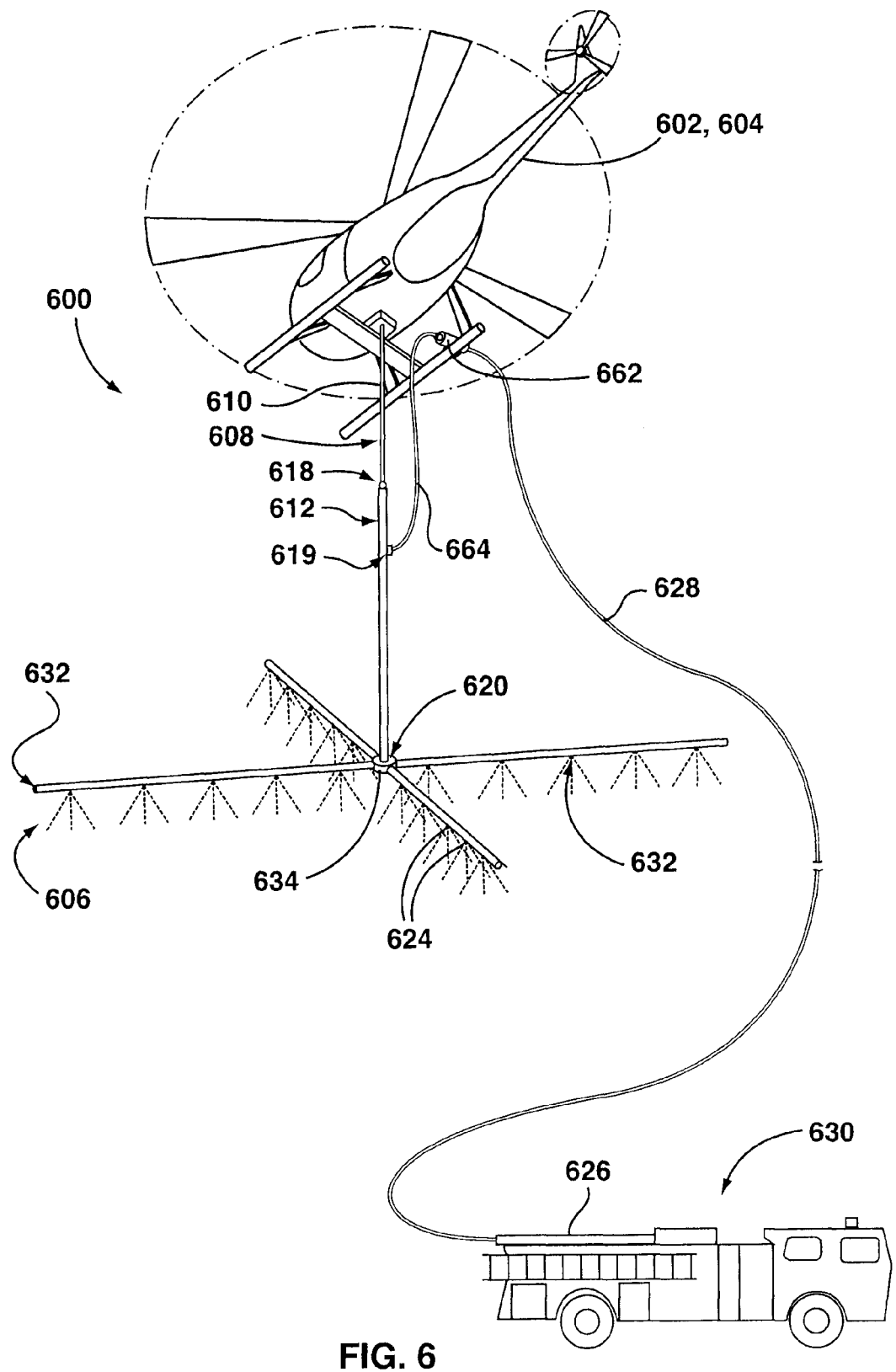

Referring now to FIG. 6, in which like reference numerals are used to refer to like elements as in FIGS. 1 to 5, with the first digit incremented to 6, an alternate example of an aerial distribution system 600 is shown. The aerial distribution system 600 is similar to the aerial distribution system 500, however the second hose 664 extends between the pump 662 and a mid-portion 619 of the spine. Further, the aerial distribution head 606 is not collapsible, and a deployment assembly is not provided.

Figure 7:
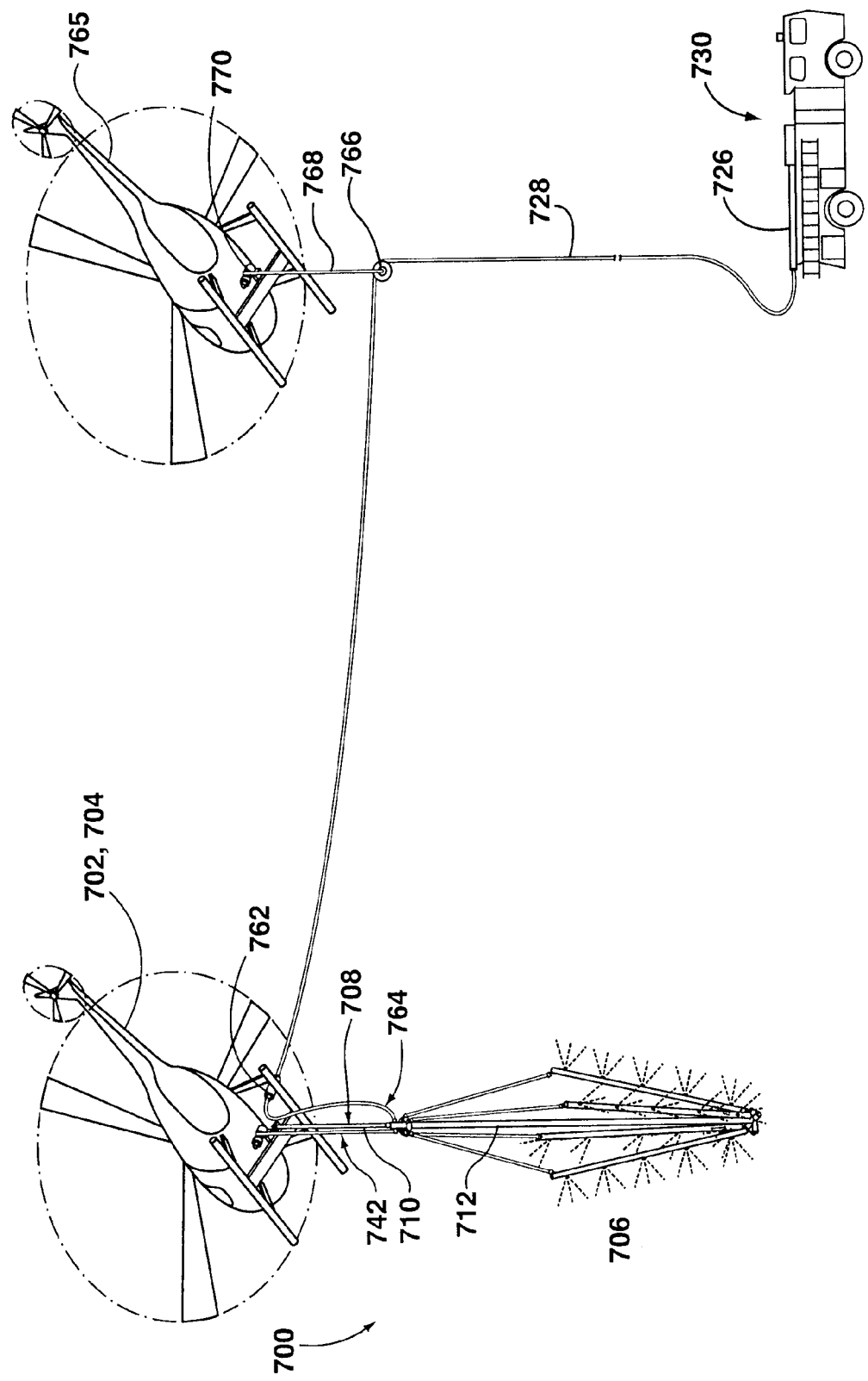

Referring now to FIG. 7, in which like reference numerals are used to refer to like elements as in FIGS. 1 to 6, with the first digit incremented to 7, another alternate example of an aerial distribution system 700 is shown. The aerial distribution system 700 is similar to the aerial distribution system 500, however a second helicopter 765 is adjacent the helicopter 704. The second helicopter 765 has a pulley 766 suspended therefrom by a cable 768 and winch 770. The pulley supports the hose 728. The pulley may optionally be motorized, to aid in supporting the hose 728.

Figure 8:
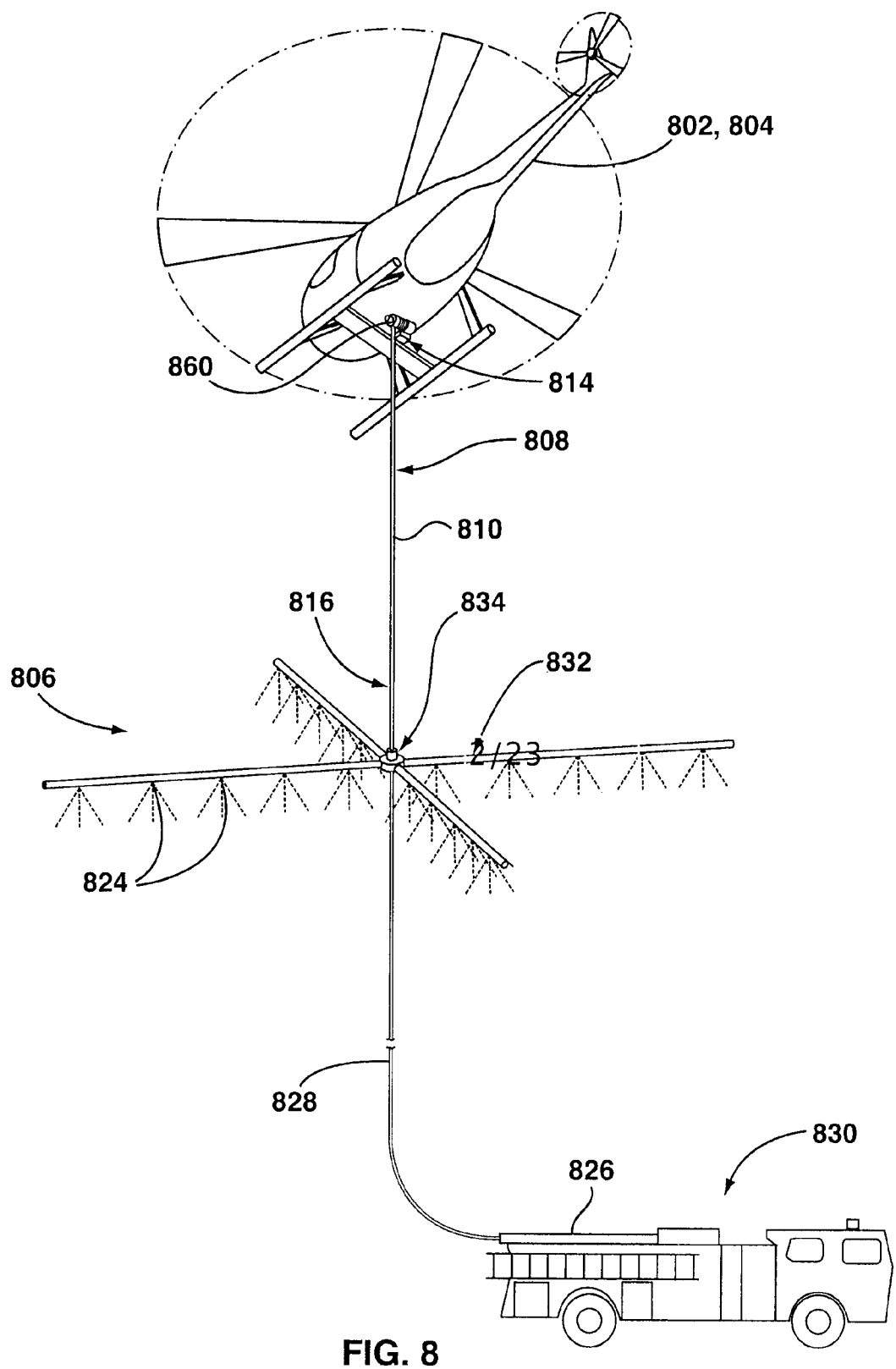

Referring now to FIG. 8, in which like reference numerals are used to refer to like elements as in FIGS. 1 to 7, with the first digit incremented to 8, another alternate example of an aerial distribution system 800 is shown. In the aerial distribution system 800, the aerial distribution head 806 is not collapsible, and a deployment assembly is not provided. Further, the suspension assembly includes only a suspension cable 810, and a spine is not provided.

Figure 9:
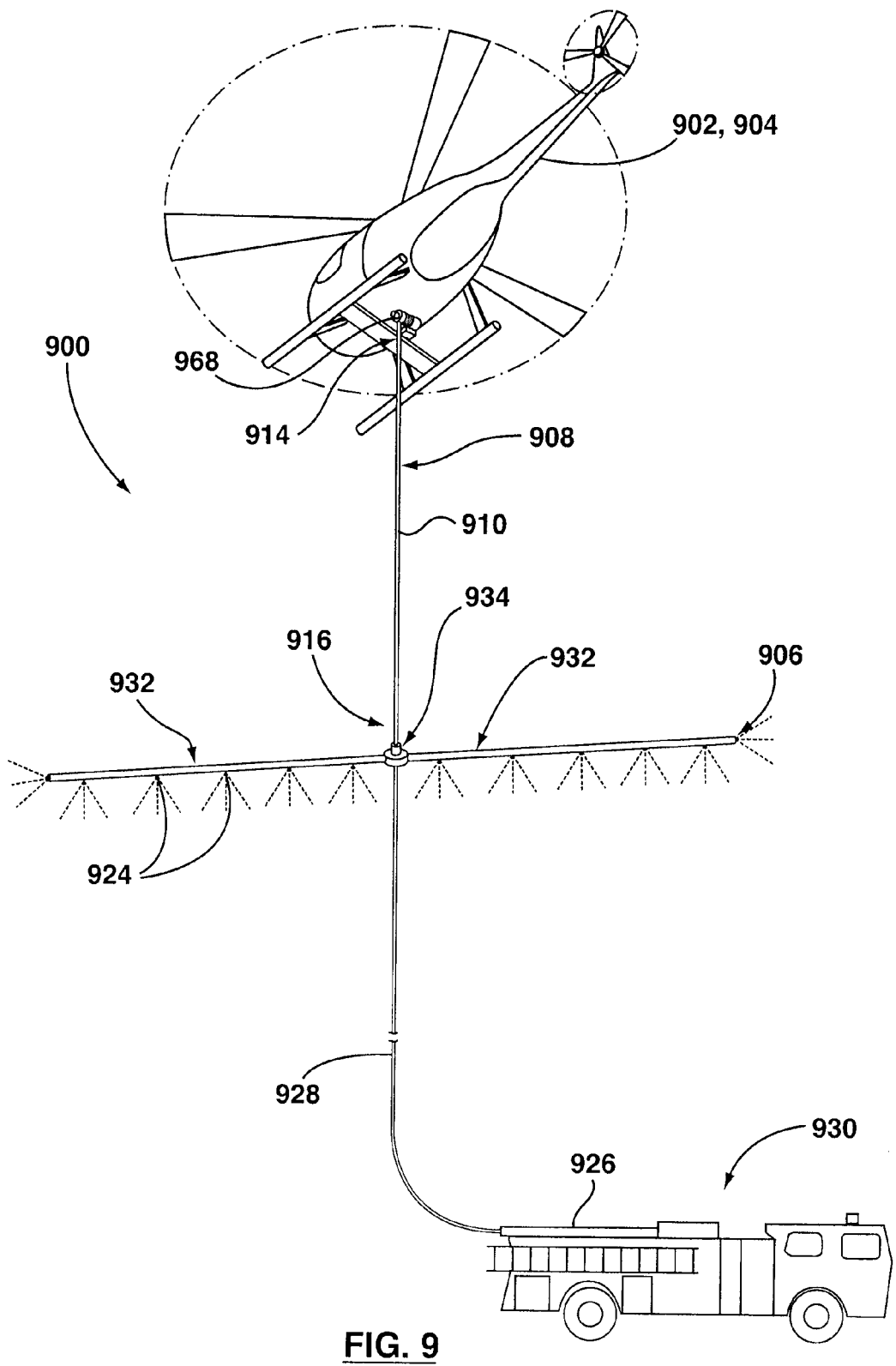

Referring now to FIG. 9, in which like reference numerals are used to refer to like elements as in FIGS. 1 to 8, with the first digit incremented to 9, another alternate example of an aerial distribution system 900 is shown. The aerial distribution system 900 is similar to the aerial distribution system 800, however, only two fluid distribution arms 932 are provided.

Figure 10:
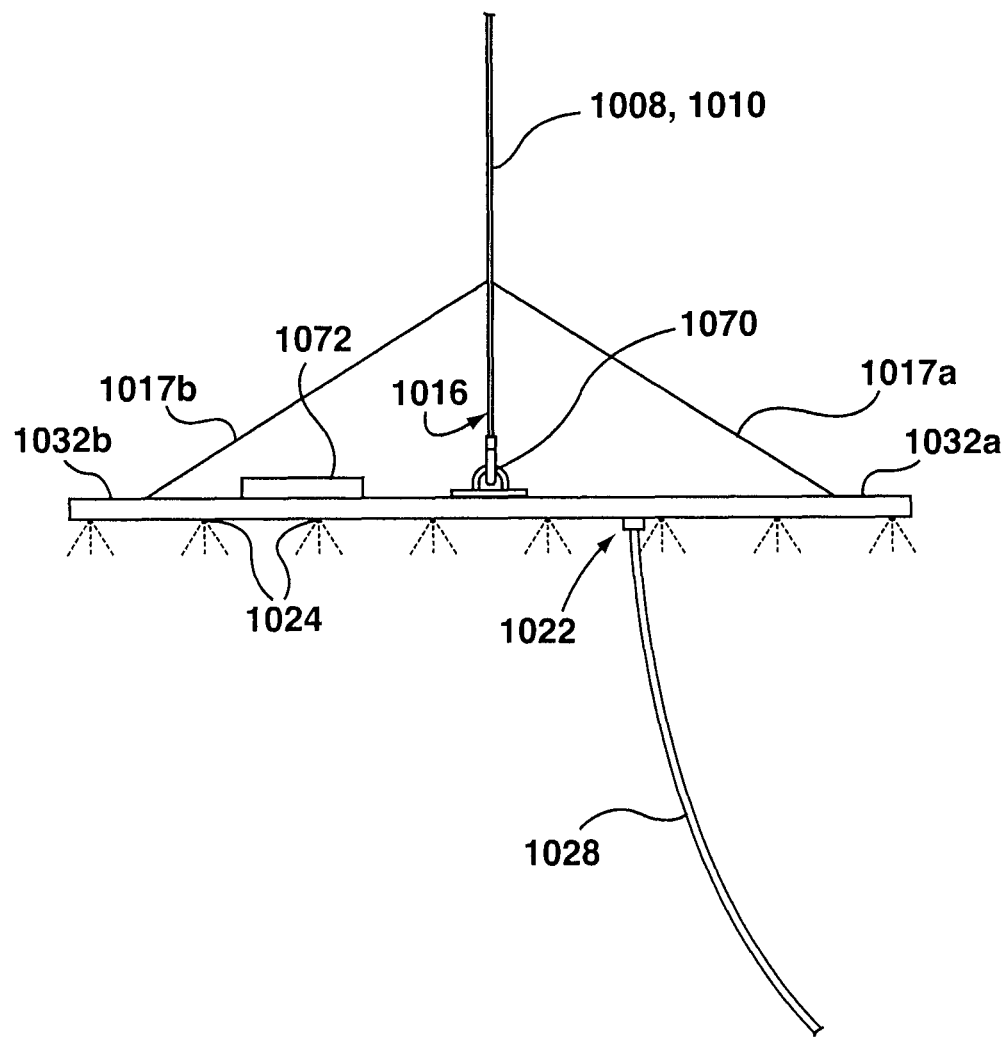

Referring now to FIG. 10, in which like reference numerals are used to refer to like elements as in FIGS. 1 to 9, with the first digit incremented to 10, another alternate example of an aerial distribution system 1000 is shown. The aerial distribution system 1000 is similar to the aerial distribution system 900, however the arms 1032 are integral with each other, and a hub is not provided. The hose 1028 is coupled directly to one of the arms 1032a, and a counterweight 1072 is mounted to the other arm 1032b. A coupling 1070 connects the arms 1032 to the suspension cable 1010. Side cables 1017a, 1017b further support the fluid distribution head 1006, and are connected between the fluid distribution head 1006 and the suspension cable 1010.

Figure 11:
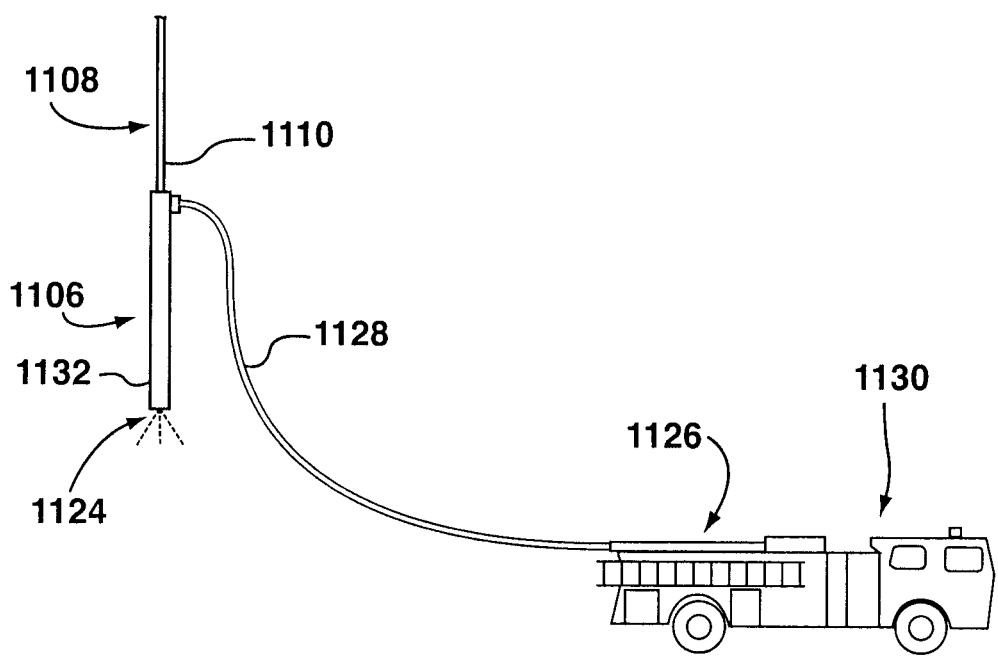

Referring now to FIG. 11, in which like reference numerals are used to refer to like elements as in FIGS. 1 to 10, with the first digit incremented to 11, another alternate example of an aerial distribution system 1100 is shown. In the aerial distribution system 1100, the fluid distribution head 1106 includes a single vertically extending fluid distribution arm 1132, and the fluid distribution head 1106 is not collapsible.

Figure 12:
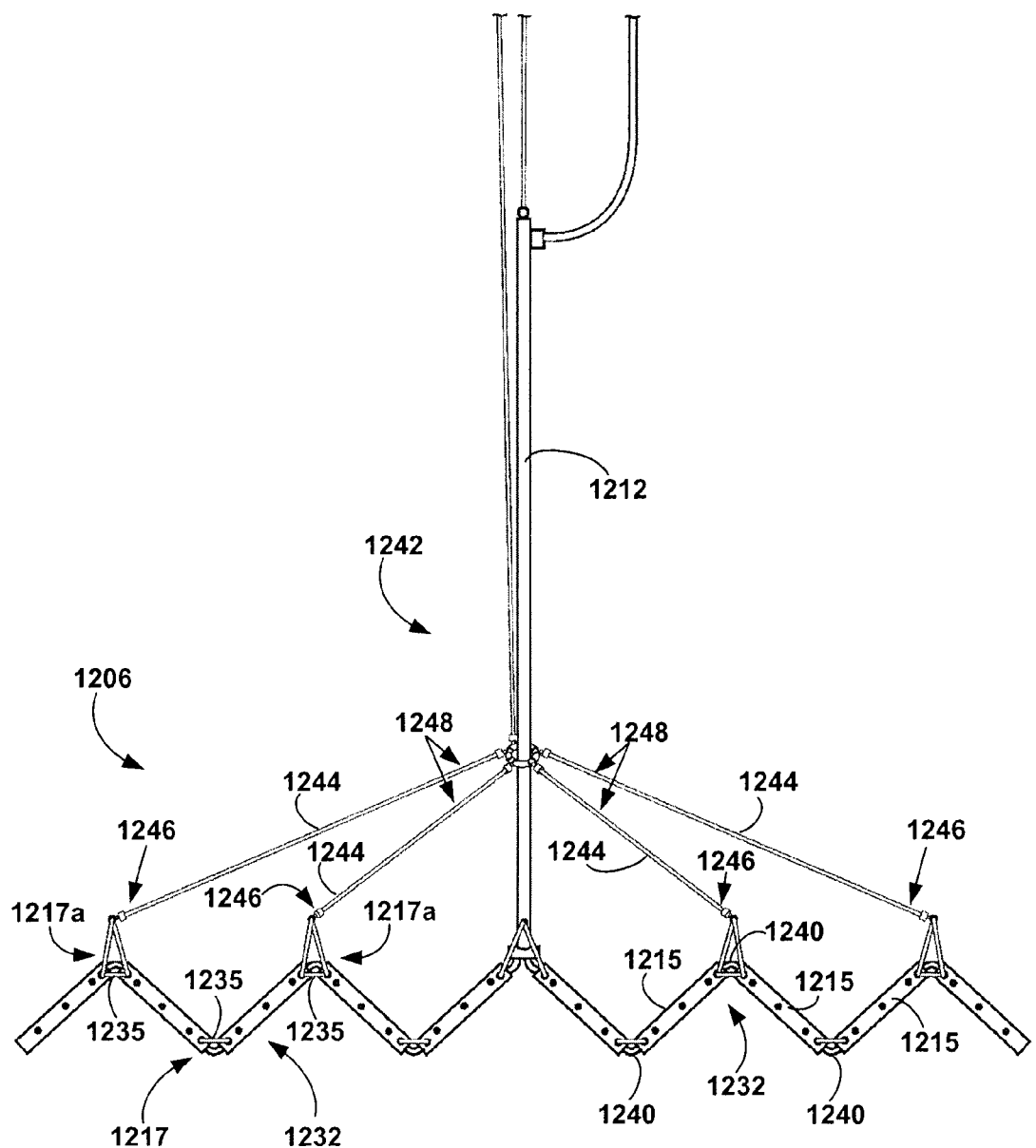

Referring now to FIG. 12, in which like reference numerals are used to refer to like elements as in FIGS. 1 to 11, with the first digit incremented to 12, an alternate example of a fluid distribution head 1206 is shown. The fluid distribution head 1206 includes only two arms 1232. Each arm includes a plurality of arm portions 1215, which are pivotably joined together at joints 1217 by links 1235. Each arm portion is in fluid communication with an adjacent arm portion by a hose 1240. Alternating joints 1217a are coupled to a deployment assembly 1242, which is similar to the deployment assembly 142 described hereinabove. Particularly, a plurality of deployment cables 1244 are provided, each of which has a first end 1246 coupled to one of the joints 1217a, and a second end 1248 that is raisable and lowerable. When the second end 1248 is raised, the joints 1217a are raised, and the arm portions 1215 pivot about the joints 1217 and collapse in an accordion manner towards the spine 1212. When the second end 1248 is lowered, the joints 1217a are lowered, and the arm portions 1215 pivot about the joints 1217 and deploy in an accordion manner away from the spine 1212.

Figure 13:
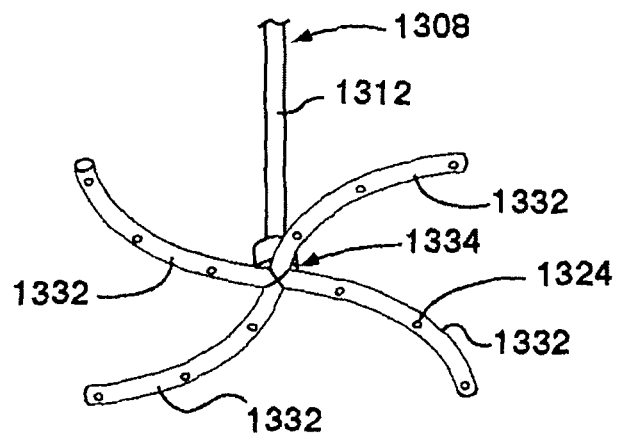

Referring now to FIG. 13, in which like reference numerals are used to refer to like elements as in FIGS. 1 to 12, with the first digit incremented to 13, an alternate example of a fluid distribution head 1306 is shown. The fluid distribution head 1306 is similar to the fluid distribution head 806; however the fluid distribution arms 1332 are of a curved shape. Further, in this embodiment, the fluid distribution arms can rotate and spin.

Figure 14:
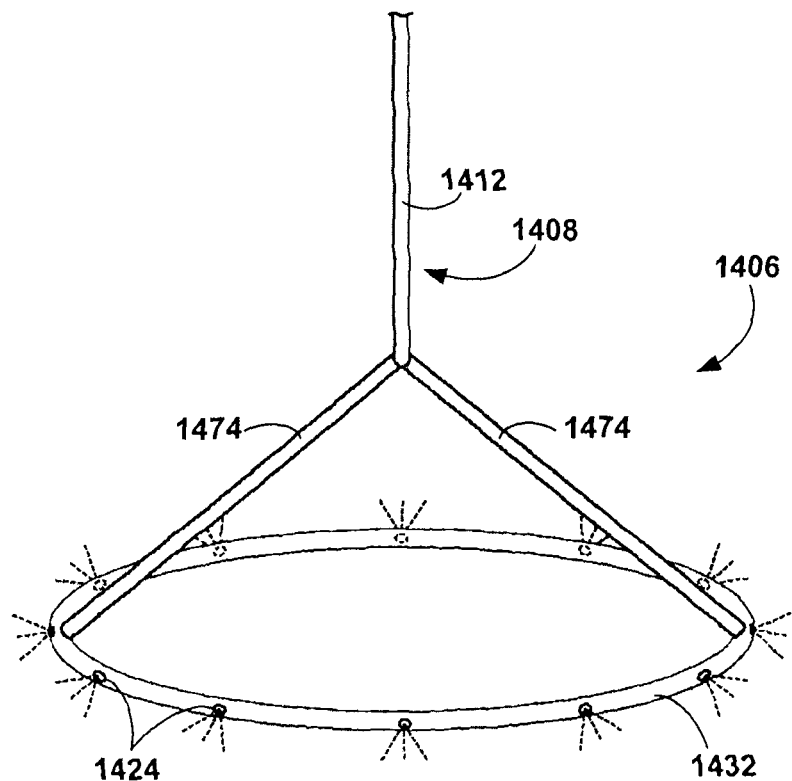

Referring now to FIG. 14, in which like reference numerals are used to refer to like elements as in FIGS. 1 to 13, with the first digit incremented to 14, an alternate example of a fluid distribution head 1406 is shown. The fluid distribution head 1406 includes a single ring shaped fluid distribution arm 1432, as well as two supporting bars 1474, which are coupled to the spine 1412.

Figure 15:
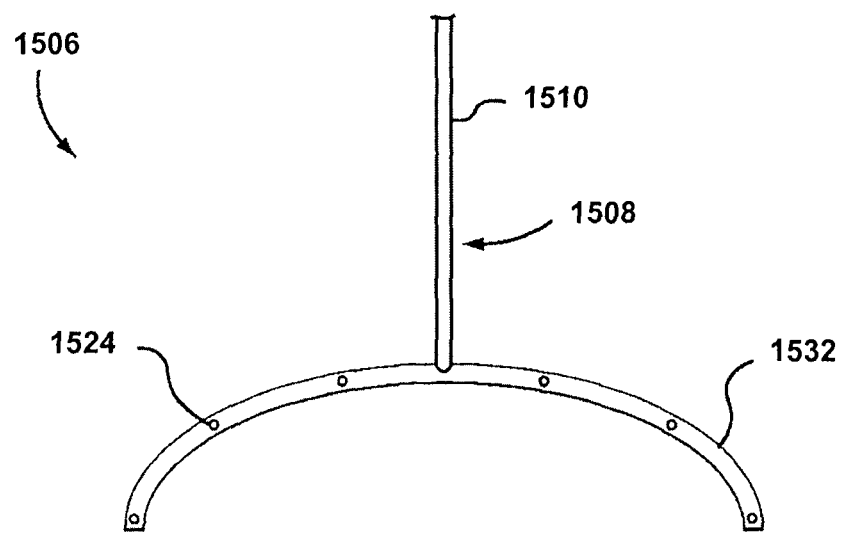

Referring now to FIG. 15, in which like reference numerals are used to refer to like elements as in FIGS. 1 to 14, with the first digit incremented to 15, an alternate example of a fluid distribution head 1506 is shown. The fluid distribution head 1506 includes a single arc shaped fluid distribution arm 1532, that is coupled to the suspension cable 1510.

In further alternate examples (not shown), fluid distribution arms may be of alternate shapes, for example S-shaped.

Figure 16:
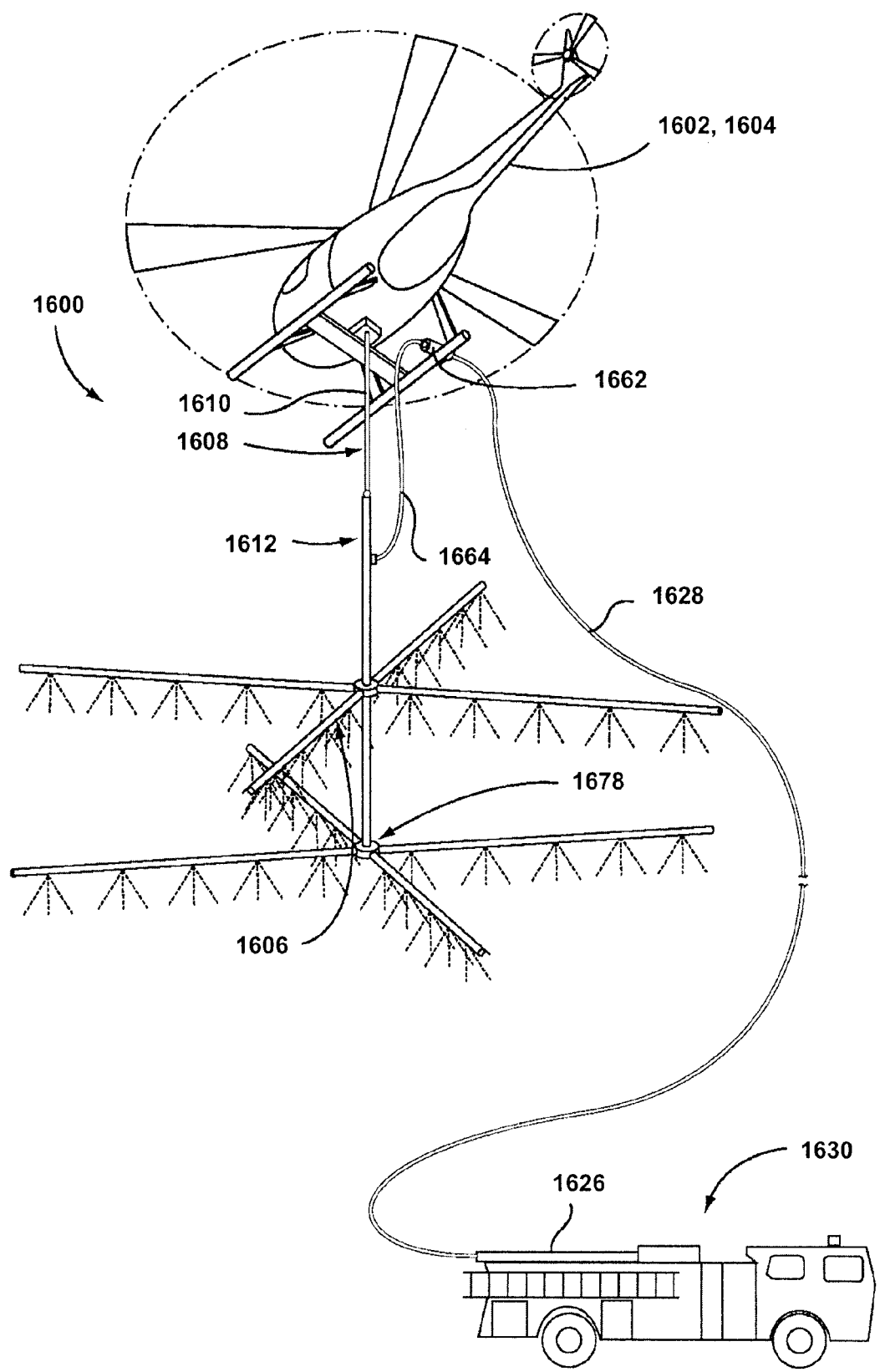

Referring now to FIG. 16, in which like reference numerals are used to refer to like elements as in FIGS. 1 to 15, with the first digit incremented to 16, an alternate example of an aerial distribution system 1600 is shown. The aerial distribution system 1600 is similar to the aerial distribution system 500; however, the aerial distribution system 1600 includes a second fluid distribution head 1678 that is mounted to the spine 1612 above the fluid distribution head 1606. In this example, neither of the fluid distribution heads 1606, 1678 are collapsible. However, in alternate examples, one or both of the fluid distribution heads may be collapsible.

Figure 17:
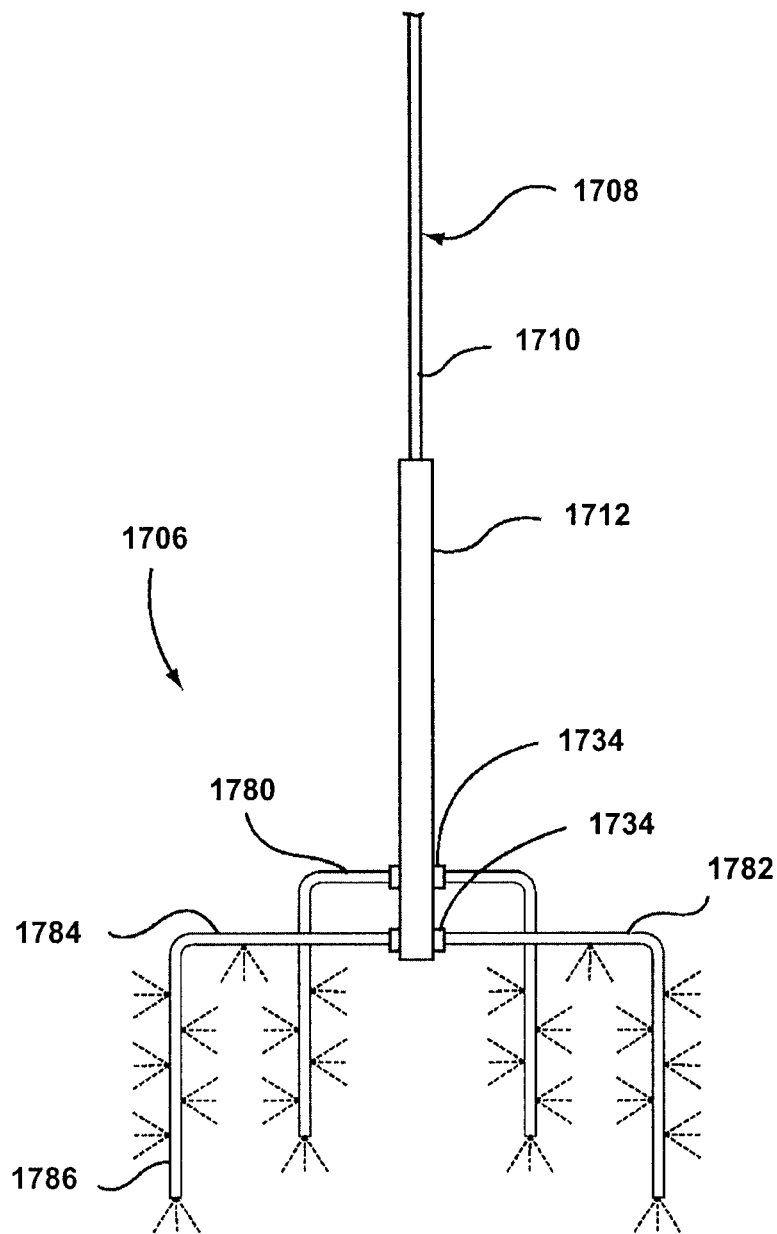

Referring now to FIG. 17, in which like reference numerals are used to refer to like elements as in FIGS. 1 to 16, with the first digit incremented to 17, an alternate example of an aerial distribution system 1700 is shown. In this example, the fluid distribution head includes one pair of arms 1780 mounted to the spine 1712 at a first elevation, and another pair of arms 1782 mounted to the spine 1712 at a second elevation. Further, each arm 1732 includes a laterally extending portion 1784, and a downwardly extending portion 1786.

Figure 18:
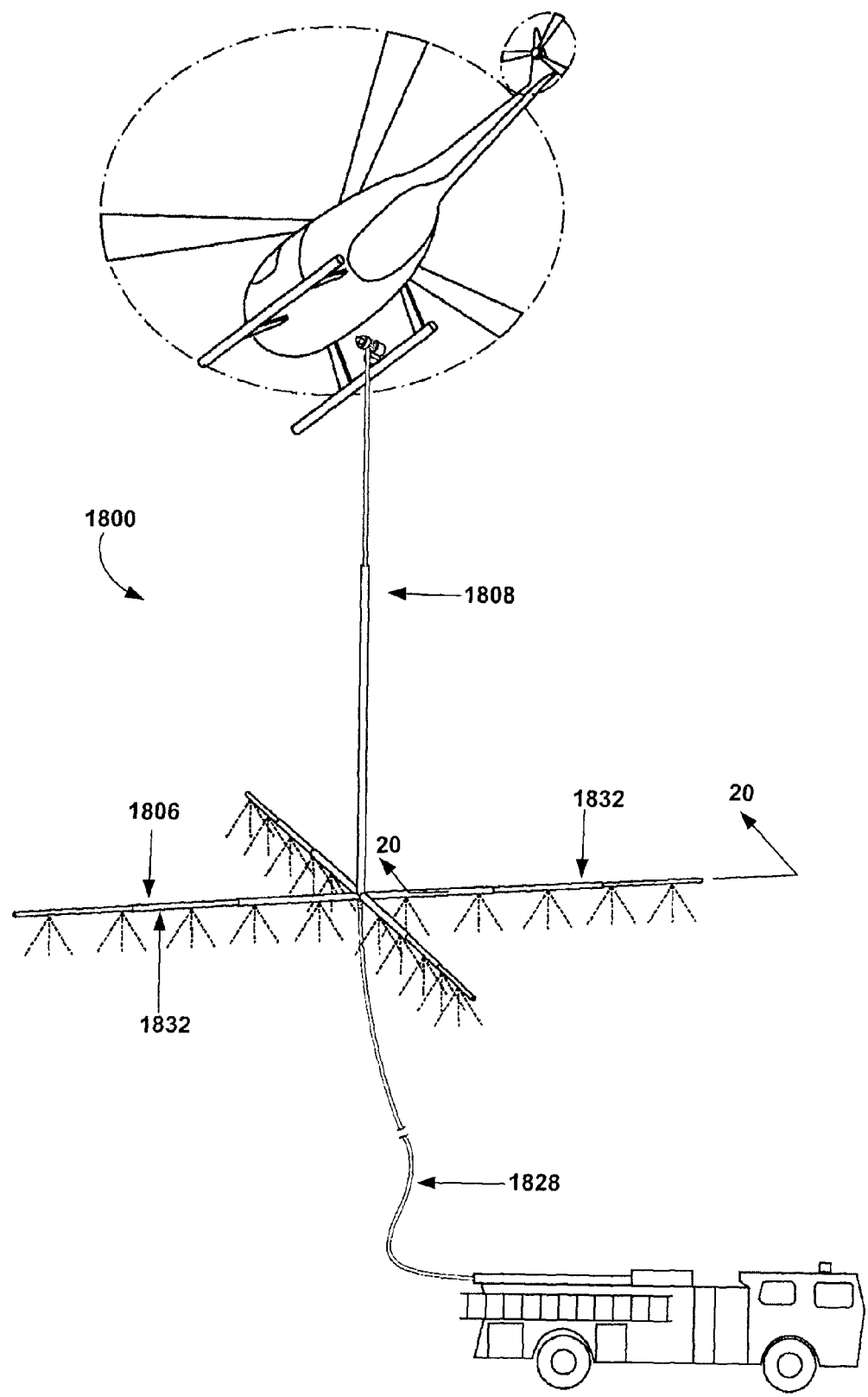
Figure 19:
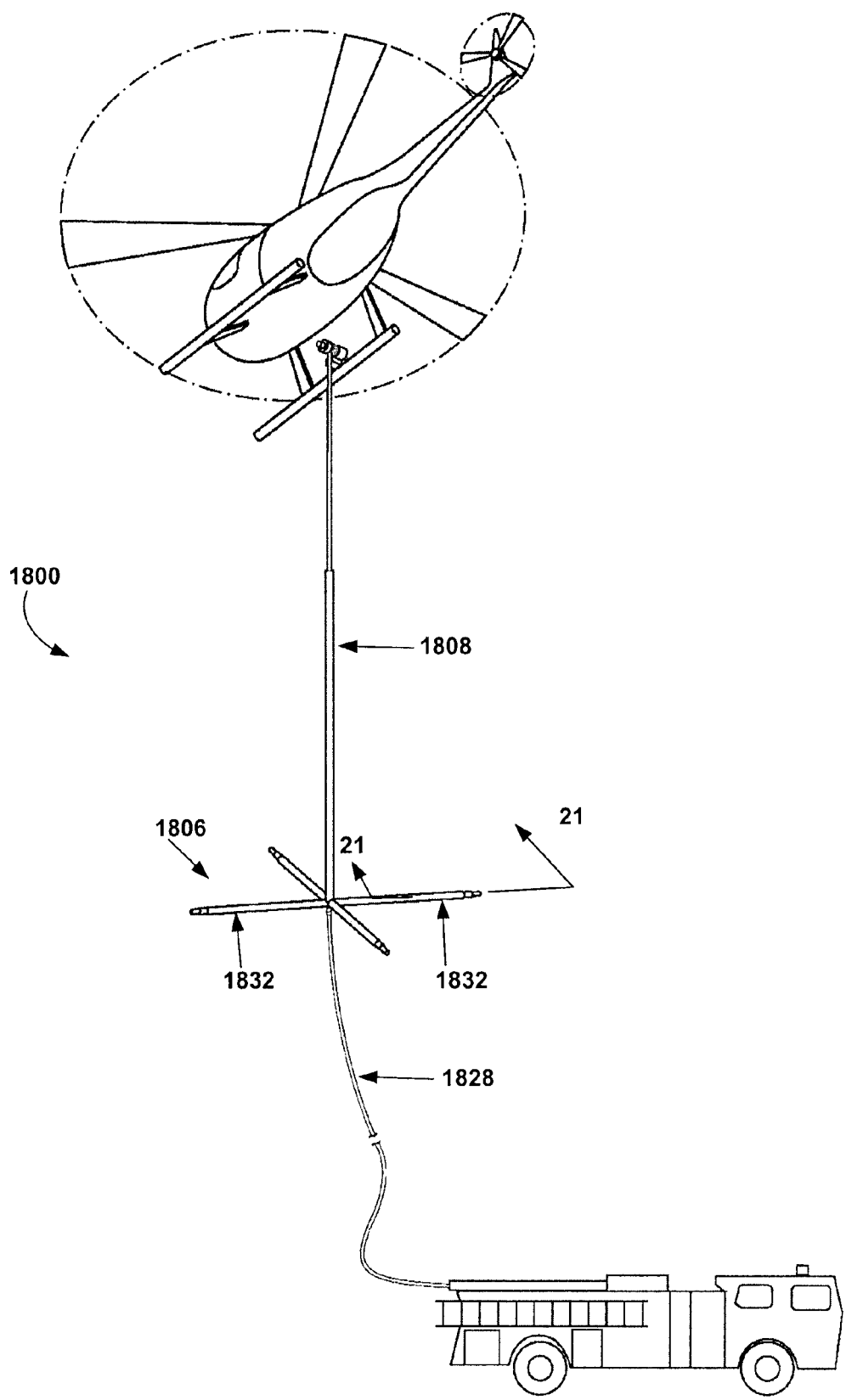

Referring now to FIGS. 18 to 21, in which like reference numerals are used to refer to like elements as in FIGS. 1 to 17, with the first digit incremented to 18, another alternate example of an aerial distribution system 1800 is shown. Referring to FIGS. 18 and 19, the fluid distribution head 1806 includes four arms 1832 which are telescopic, and may be extended or retracted to reconfigure the fluid distribution head 1806 between the deployed position, shown in FIG. 18, and the collapsed position, shown in FIG. 19.

Referring to FIGS. 20 and 21, each arm 1832 includes a series of arm portions 1833a, 1833b, and 1833c, which are in fluid communication with each other. The arm portion 1833c is slidably received within the arm portion 1833b, and the arm portion 1833b is slidably received within the arm portion 1833a. When in the deployed position, the arm portions 1833 are slid outwardly away from each other, and when in the collapsed configuration, the arm portions 1833 are slid inwardly towards each other.

Figure 22:
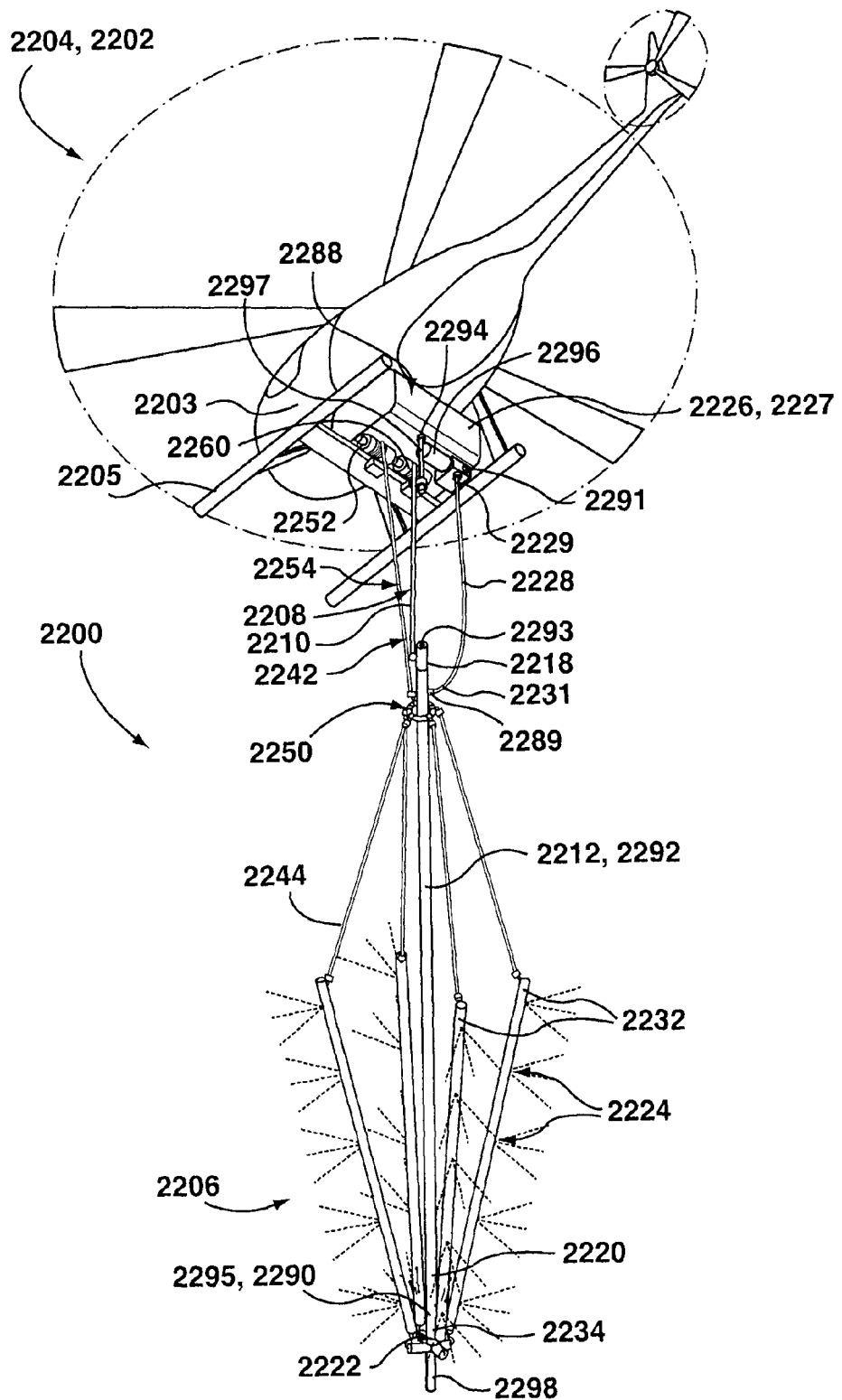

Referring still to FIGS. 20 and 21, a deployment assembly 1842 is provided for reconfiguring the fluid distribution head 1806 between the deployed position and the collapsed position. The deployment assembly 1842 includes a plurality of springs 1837 mounted within each fluid distribution arm 1832. Particularly, a first spring 1837a is mounted between the arm portion 1833a and the arm portion 1833b, and a second spring 1837b is mounted between the arm portion 1833b and 1833c. The arms 1832 are biased towards the collapsed configuration by the springs 1837a and 1837b, as shown in FIG. 21. The deployment assembly 1842 is actuated by feeding fluid to the fluid distribution head 1806 (e.g. via the hose 1828). The force of the fluid overcomes the biasing force of the springs 1837, and causes the arm portions 1833 to move to the deployed configuration, as shown in FIG. 22. When the flow of fluid is stopped, the arm portions will return to the collapsed configuration, due to the biasing force of the springs 1837.

Figure 23:
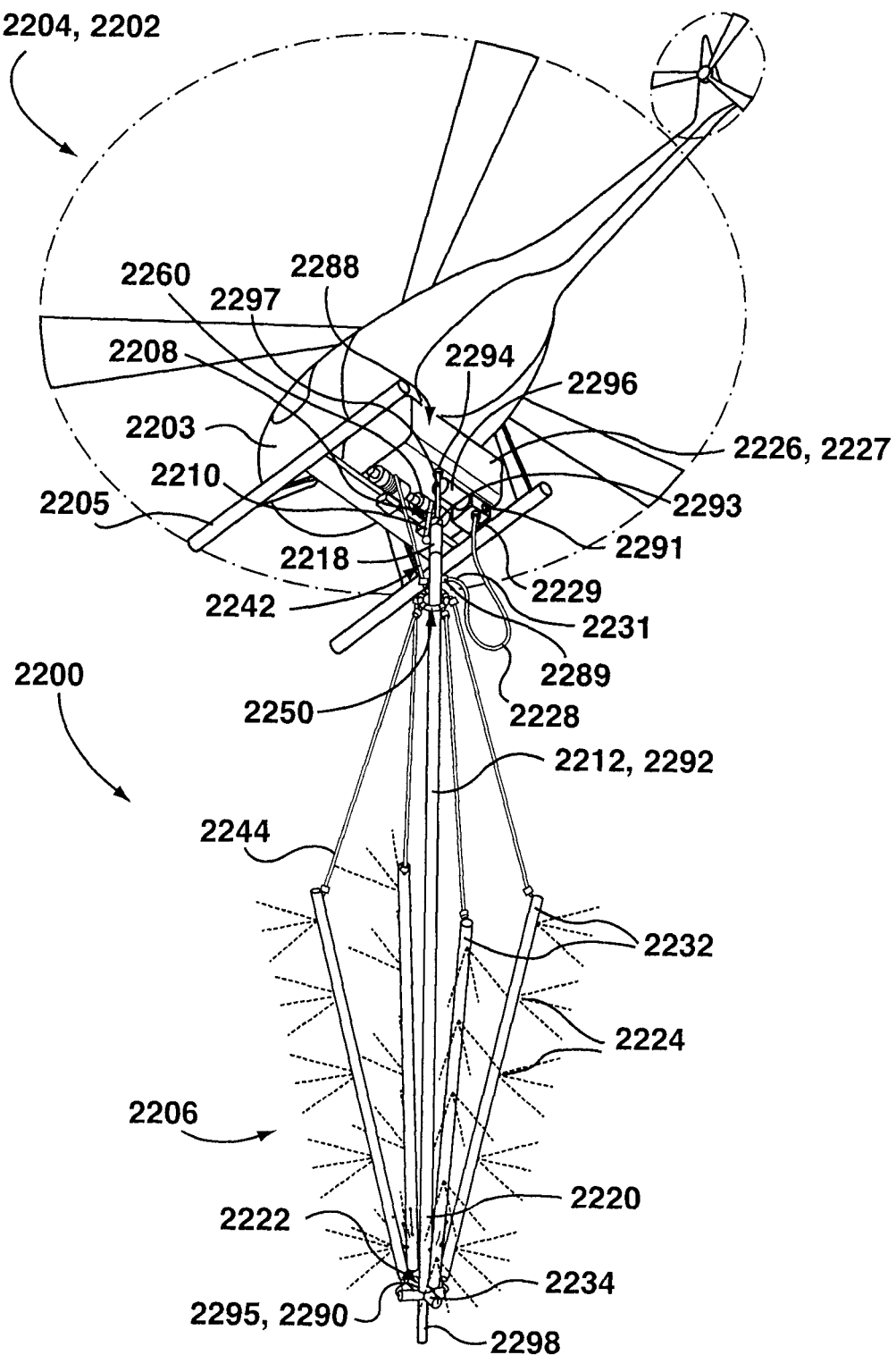
Figure 24:
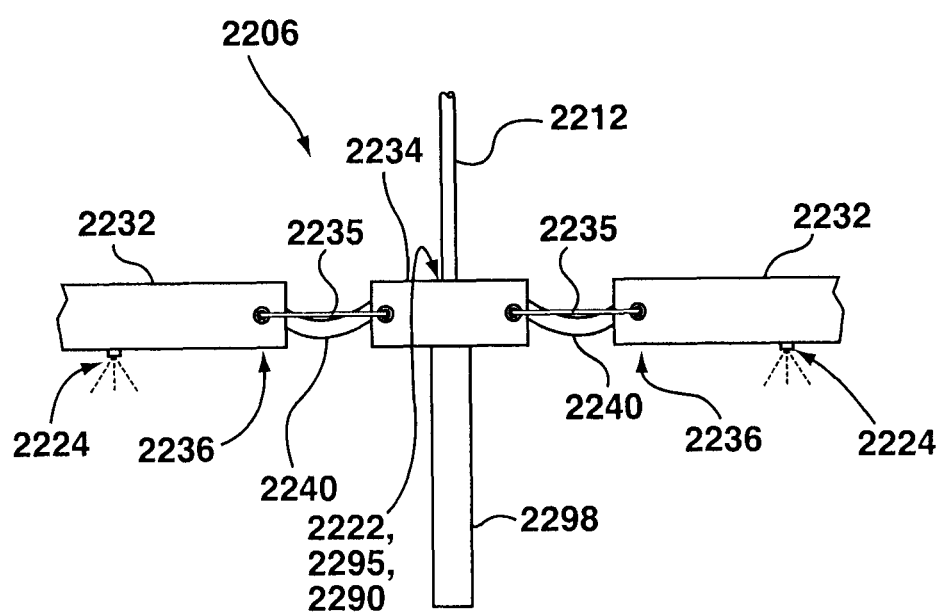

Referring now to FIGS. 22 to 24, in which like reference numerals are used to refer to like elements as in FIGS. 1 to 21, with the first digit incremented to 22, an alternate example of an aerial distribution system 2200 is shown. The aerial distribution system 2200 is similar to the aerial distribution system 100, and like features are identified by like reference characters incremented by 2100. In the system 2200, the fluid source 2226 comprises a reservoir 2227 that is mounted to the helicopter 2204 and is at a fixed elevation relative to the helicopter 2204, and the aerial distribution system 2200 comprises a refill circuit 2288 for refilling the reservoir with fluid.

Referring still to FIG. 22, in the example shown the reservoir 2227 is generally affixed to the fuselage 2203 of the helicopter 2204, and may be positioned vertically intermediate the fuselage and the skids 2205. A hose 2228 is provided which has an upper (inlet) end 2229 that is in fluid communication with, and may be joined to an outlet of, the reservoir 2227. The hose 2228 further has a lower (outlet) end 2231 that is in fluid communication with, and may be joined to, the head fluid inlet 2222. In the example illustrated, the spine 2212 has an inlet 2289 that and the lower, outlet end 2231 of the hose is generally joined to the spine inlet 2289. The spine further includes a spine outlet 2290 that is in communication with the head fluid inlet 2222.

The hose 2228 may have a diameter sufficient to conduct a significant flow rate from the reservoir to the distribution head. In the example illustrated, the hose 2228 may have a diameter generally in the range from about 10 cm to about 20 cm. The hose may be constructed of one or more outer layers of woven fabric with an inner layer of rubber. The hose 2228 may be collapsible, and may be stored flat to minimize the space required when stowed on board the aerial lift device. The hose may have a length sufficient to space the aerial lift device (e.g. helicopter) at a distance well above the target when dispensing fluid from the dispensing head. This can facilitate covering a wide area with the fluid, and can facilitate keeping occupants on board the aerial lift device at a safe distance. In the example illustrated, the hose 2228 has a length generally in a range from about 30 m to about 75 m.

Referring still to FIG. 22, in the example shown, the suspension assembly 2208 is actuatable to move the fluid distribution head 2206 between a raised position, shown in FIG. 23, and a lowered position, shown in FIG. 22, with respect to the helicopter 2204. Further, the fluid distribution system 2200 includes a hose reel 2291 mounted to the helicopter 2204, so that the hose 2228 is collapsible into a stowed configuration when the fluid distribution head 2206 is in a raised position, and extendible to an extended position when the fluid distribution head 2206 is in the lowered position.

Referring still to FIGS. 22 and 23, as mentioned above, in the example illustrated the aerial distribution system 2200 comprises a refill circuit 2288 for refilling the reservoir with fluid. The refill circuit 2288 may generally include a refill conduit 2292. In the example shown, the spine 2212 serves as the refill conduit 2292. The spine 2212 includes a refill conduit inlet 2295 connectable in fluid communication with a refill fluid source. In the example shown, the refill conduit inlet 2295 is the same as the outlet 2290 of the spine 2212, and may be connected with a refill fluid source as will be described further below. The spine further includes a refill conduit outlet 2293 in fluid communication with a refill inlet 2294 of the reservoir. In the example shown, the refill conduit outlet 2293 is at the first end portion 2218 of the spine 2212, and is separate from the inlet 2289 and outlet 2290 of the spine 2212. A pump 2296 is mounted to the helicopter 2204 and engagable to draw fluid through the refill conduit 2292 and into the refill inlet 2294 of the reservoir.

In the example shown, the refill circuit 2288 is usable to refill the reservoir 2227 with fluid only when the fluid distribution head 2206 is in a raised configuration, as shown in FIG. 23. Specifically, when the fluid distribution head 2206 is in the raised configuration, the refill conduit outlet 2293 is connected fluid communication with the refill inlet 2294 of the reservoir 2227, and the refill conduit inlet 2295 may be placed in fluid communication with a refill fluid source, in order to refill the reservoir 2227. When the fluid distribution head 2206 is in the lowered configuration, the refill conduit outlet 2293 is spaced from the refill inlet 2294 of the reservoir 2227, and the refill conduit 2293 may not be used to refill the reservoir 2227.

In order to provide fluid communication between the refill conduit outlet 2293 and the refill inlet 2295 of the reservoir 2227 when the fluid distribution head 2206 is in the raised configuration, an engagement member 2297 is mounted to the refill inlet 2295 of the reservoir 2227. The engagement member 2297 is received in the first end portion 2218 of the spine 2212 when the fluid distribution head 2206 is in the raised configuration. The engagement member 2297 further includes a one way valve (not shown), which allows fluid to flow into the refill inlet 2294 of the reservoir 2227 from the spine 2212, but not out of the refill inlet 2294.

In an alternate example, an engagement member may be configured to receive the first end portion of the spine. In such examples, the engagement member may optionally be generally funnel shaped, having an opening that has a larger diameter than the second end portion of the spine. This may allow the engagement member to guide the second end portion of the spine into the engagement member.

As mentioned hereinabove, the outlet 2290 of the spine 2227, which is also the refill conduit inlet 2295, is in communication with the head fluid inlet 2222, in order to allow fluid to be distributed from the hose 2228 to the fluid distribution head 2206. In order to place the refill conduit inlet 2295 in fluid communication with a refill fluid source, the hub 2234 of the fluid distribution head 2206 includes a refill port 2298, which extends downwardly therefrom, and which is in fluid communication with the head fluid inlet 2222. The refill port 2298 includes a one-way valve (not shown), which allows fluid to flow upwardly into but not downwardly out of the refill port 2298. Refill fluid may be drawn into the refill port 2298 from any suitable refill source. For example helicopter 2204 may be lowered towards a body of water such as a lake, so that the refill port 2298 is submerged in the lake. The pump 2296 may then be engaged, so that refill fluid is drawn into the refill port 2298, through the hub 2234, out of the head fluid inlet 2222, into the refill conduit inlet 2295, through the refill conduit 2292, out of the refill conduit outlet 2293, and into the reservoir refill inlet 2295.

In the example shown, the refill conduit 2292 (i.e. the spine 2212) is non-collapsible. That is, the refill conduit 2292 is generally rigid. In alternate examples, a refill conduit may be a collapsible, for example, collapsible a hose.

In further alternate examples, the refill circuit 2288 may be usable to refill the reservoir with fluid both when the fluid distribution head 2206 is in a raised configuration, and when the fluid distribution head 2206 is in a lowered configuration.

Figure 25:
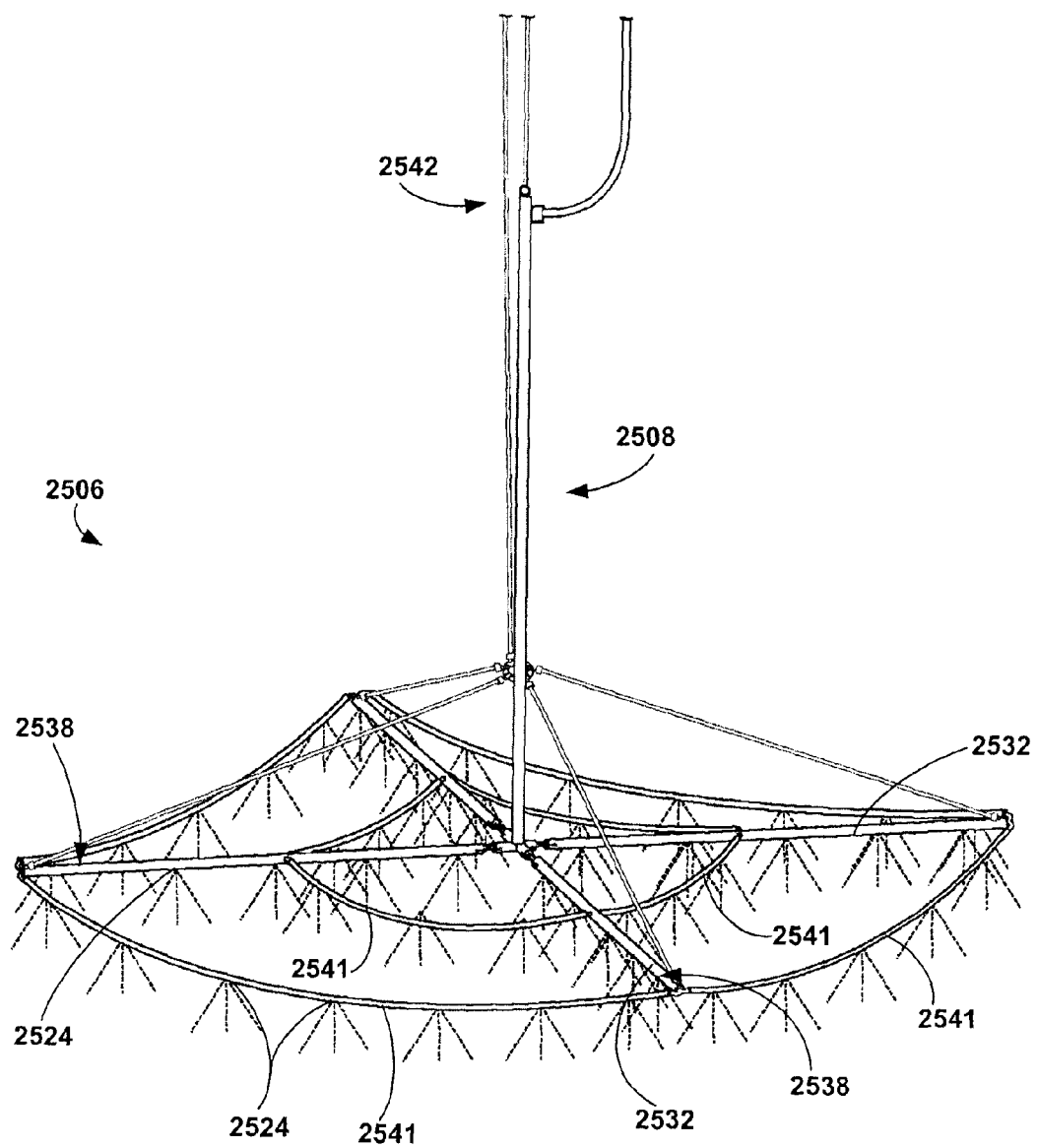

Referring now to FIG. 25, in which like reference numerals are used to refer to like elements as in FIGS. 1 to 24, with the first digit incremented to 25, another alternate example of an aerial distribution head 2506 is shown. The fluid distribution head 2506 is similar to the fluid distribution head 106, however the fluid distribution head 2506 further includes a plurality of hoses 2541 extending between and in fluid communication with the arms 2532. The head outlets 2524 are provided in the hoses 2541 in addition to in the arms 2532.

In the example shown, a first set of the hoses 2541 extends between the second end portions 2538 of the arms 2532, and a second set of the hoses 2541 extends between the mid-portions of the arms 2532. In alternate examples, the hoses may be positioned elsewhere with respect to the arms 2532.

Figure 26:
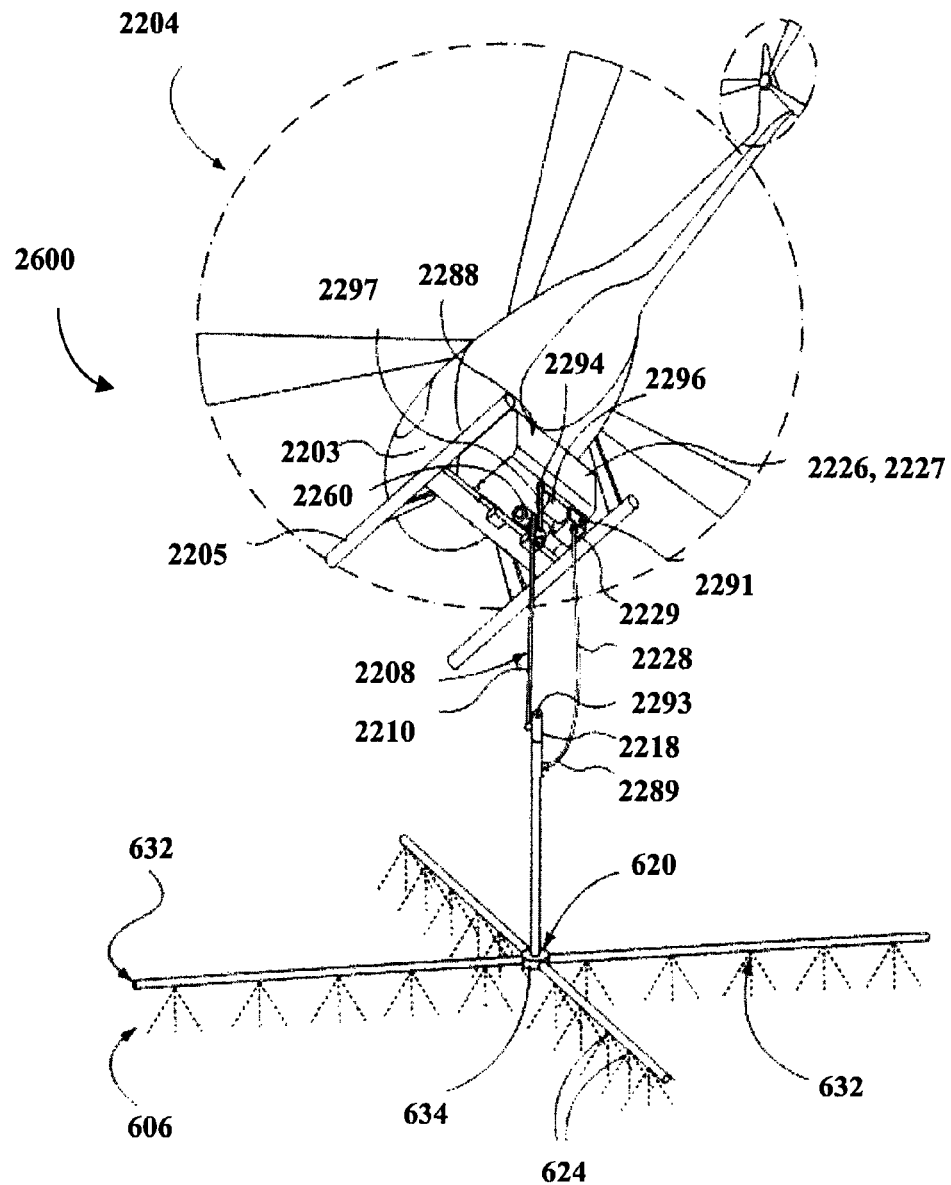

Referring now to FIG. 26, an alternate aerial distribution system 2600 is shown. The aerial distribution 2600 is similar to the aerial distribution system 2200, and includes a reservoir 2227 that is mounted to the helicopter 2204, and a refill circuit 2288 for refilling the reservoir with fluid. However, the aerial distribution system 2600 includes the fluid distribution head 600 of FIG. 6, which is non-collapsible, and does not include a deployment assembly.

In any of the above examples, the fluid distribution head 106-2606 may remain attached to the helicopter 104-2304 during flight, including take-off and landing. For example, when helicopter 104 is landing, the fluid distribution head 106 may rest on the ground adjacent the helicopter 104. The spine may be pivotable from the vertical position (when the helicopter is in flight), to a generally horizontal position along the ground (when the helicopter descends for landing).

The invention claimed is:

1. An aerial distribution system comprising:
   a) a distribution assembly comprising:
      i) a fluid distribution head comprising at least one head fluid inlet, an elongate spine, a hub coupled to one end of the spine and at least first and second rigid fluid distribution arms extending from the hub;
      ii) a first head fluid outlet disposed on the first arm, the first head fluid outlet being spaced apart from and fluidly connected to the hub;
      iii) a second head fluid outlet disposed on the second arm, the second head fluid outlet being spaced apart from and fluidly connected to the hub and being spaced apart from the first head fluid outlet;
      iv) a suspension assembly for suspending the fluid distribution head from an aerial lift system; and
   b) a fluid source separate from the distribution assembly and connectable in fluid communication with the at least one head fluid inlet.

2. The aerial distribution system of claim 1, wherein the fluid distribution head is reconfigurable between a deployed position and a collapsed position and further comprising a deployment assembly coupled to the fluid distribution head and actuatable to reconfigure the fluid distribution head between the deployed position and the collapsed position, the deployment assembly comprising at least one deployment cable, each deployment cable comprising a deployment cable first end portion secured to one of the arms, and a deployment cable second end portion that is raisable and lowerable to pivot each respective arm about the hub and reconfigure the fluid distribution head between the deployed position and the collapsed position, the deployment system further comprises a slider to which each deployment cable second end portion is secured, the slider slidable along the spine to raise and lower each deployment cable second end portion.

3. An aerial distribution system comprising,
   a) a fluid distribution head comprising at least one head fluid inlet in fluid communication with a fluid source, and at least two head fluid outlets in communication with the head fluid inlet, the fluid distribution head comprising a spine, a hub mounted to one end of the spine and at least two rigid fluid distribution arms extending from the hub, each fluid distribution arm comprising at least one of the head fluid outlets, an arm first end portion and an arm second end portion spaced apart from the arm first end portion, the fluid distribution head is reconfigurable between a deployed position and a collapsed position, and b) a suspension assembly for suspending the fluid distribution head from an aerial lift system, the suspension assembly actuatable to raise and lower the fluid distribution head with respect to the aerial lift system between a storage position and a use position; and c) a deployment assembly coupled to the fluid distribution head and actuatable to reconfigure the fluid distribution head between the deployed position and the collapsed position, the deployment assembly comprising at least one deployment cable, each deployment cable comprising a deployment cable first end portion secured to one of the arm second end portions, and a deployment cable second end portion that is raisable and lowerable to pivot each respective arm about the hub and reconfigure the fluid distribution head between the deployed position and the collapsed position, the deployment system further comprises a slider to which each deployment cable second end portion is secured, the slider slidable along the spine to raise and lower each deployment cable second end portion.

4. The aerial distribution system of claim 1, wherein the spine comprises a rigid, hollow conduit and is in fluid communication between the at least one head fluid inlet and the fluid source.

5. An aerial distribution system comprising:
a) a distribution assembly comprising
 a fluid distribution head comprising at least one head fluid inlet and at least two head fluid outlets in communication with the head fluid inlet, the fluid distribution head comprising an elongate spine, a hub mounted to one end of the spine and at least two rigid fluid distribution arms extending from the hub, each fluid distribution arm comprising at least one of the head fluid outlets;
ii) a suspension assembly for suspending the fluid distribution head from an aerial lift system, the suspension assembly actuatable to raise and lower the fluid distribution head with respect to the aerial lift system between a storage position and a use position; and
b) a fluid source separate from the distribution assembly and in fluid communication with the at least one head fluid inlet.

6. The aerial distribution system of claim 5, wherein the fluid distribution head is reconfigurable between a deployed position and a collapsed position, and further comprising a deployment assembly coupled to the fluid distribution head and actuatable to reconfigure the fluid distribution head between the deployed position and the collapsed position.

7. The aerial distribution system of claim 6, wherein when in the deployed configuration, each fluid distribution arm extends at a first angle with respect to the horizontal, and when in the collapsed configuration, each fluid distribution arm extends at a second angle with respect to the horizontal, wherein the second angle is greater than the first angle.

8. The aerial distribution system of claim 6, wherein when in the deployed configuration, each fluid distribution arm is generally horizontal, and when in the collapsed configuration, each fluid distribution arm is generally vertical.

9. The aerial distribution system of claim 6, wherein each fluid distribution arm has an arm first end portion and an arm second end portion spaced apart from the arm first end portion.

10. The aerial distribution system of claim 6, wherein each arm first end portion is pivotably coupled to the hub.

11. The aerial distribution system of claim 10, wherein each arm second end portion is proximate the spine when the head is in the collapsed configuration, and distal the spine when the head is in the deployed configuration.

12. The aerial distribution system of claim 5, wherein the aerial lift system comprises a helicopter.

13. The aerial distribution system of claim 12, wherein the fluid distribution head remains coupled to the helicopter during flight, including take-off and landing.

14. The aerial distribution system of claim 9, wherein the deployment assembly comprises at least one deployment cable, each deployment cable comprising a deployment cable first end portion secured to one of the arm second end portions, and a deployment cable second end portion that is raisable and lowerable to pivot each respective arm about the hub and reconfigure the fluid distribution head between the deployed position and the collapsed position.

15. The aerial distribution system of claim 5, wherein each fluid distribution arm is mounted to the hub such that each fluid distribution arm extends radially from the hub.

16. The aerial distribution system of claim 5, wherein the suspension assembly comprises a suspension cable having a suspension cable first end portion secured to the aerial lift system, and an opposed suspension cable second end portion.

17. The aerial distribution system of claim 16, wherein the spine comprises a first end portion that is secured to the suspension cable second end portion and is spaced apart from the one end of the spine to which the hub is mounted and an opposed spine second end portion.

18. The aerial distribution system of claim 5, wherein the spine is rigid.

19. The aerial distribution system of claim 5, wherein the spine provides fluid communication between the fluid source and the at least one head fluid inlet.

20. The aerial distribution system of claim 5, wherein the fluid source is portable on board the aerial lift system.

21. The aerial distribution system of claim 5, wherein the fluid source is supported on the ground.

22. The aerial distribution system of claim 5, further comprising a fluid conduit connectable between the fluid source and each head fluid inlet.

23. The aerial distribution system of claim 3, wherein the deployment assembly further comprises:
a) a winch system; and
b) a winching cable having a winching cable first end portion secured to the slider, and a winching cable second end portion secured to the winch.

* * * * *